United States Patent
Wang et al.

(10) Patent No.: US 10,701,255 B2
(45) Date of Patent: Jun. 30, 2020

(54) PHOTOGRAPHING MODULE AND ELECTRIC BRACKET THEREOF

(71) Applicant: NINGBO SUNNY OPOTECH CO., LTD., Ningbo, Zhejiang (CN)

(72) Inventors: Mingzhu Wang, Ningbo (CN); Baozhong Zhang, Ningbo (CN); Zhenyu Chen, Ningbo (CN); Zhen Huang, Ningbo (CN); Heng Jiang, Ningbo (CN)

(73) Assignee: NINGBO SUNNY OPOTECH CO., LTD., Ningbo Zhejiang (CN)

( * ) Notice: Subject to any disclaimer, the term of this patent is extended or adjusted under 35 U.S.C. 154(b) by 0 days.

(21) Appl. No.: 15/780,532

(22) PCT Filed: Dec. 1, 2016

(86) PCT No.: PCT/CN2016/108243
§ 371 (c)(1),
(2) Date: May 31, 2018

(87) PCT Pub. No.: WO2017/092694
PCT Pub. Date: Jun. 8, 2017

(65) Prior Publication Data
US 2018/0352127 A1 Dec. 6, 2018

(30) Foreign Application Priority Data

Dec. 1, 2015 (CN) .......................... 2015 1 0868802
Dec. 1, 2015 (CN) .......................... 2015 1 0868840
Dec. 1, 2015 (CN) .......................... 2015 1 0868893

(51) Int. Cl.
*H04N 5/225* (2006.01)
*G02B 13/00* (2006.01)

(52) U.S. Cl.
CPC ......... *H04N 5/2257* (2013.01); *G02B 13/009* (2013.01); *H04N 5/2253* (2013.01); *H04N 5/2254* (2013.01)

(58) Field of Classification Search
CPC .. H04N 5/2257; H04N 5/2253; H04N 5/2254; G02B 13/009
See application file for complete search history.

(56) References Cited

U.S. PATENT DOCUMENTS

2008/0239519 A1   10/2008 Lin
2009/0079863 A1   3/2009 Aoki et al.
(Continued)

FOREIGN PATENT DOCUMENTS

CN   201450592 U   5/2010
CN   102143306 A   8/2011
(Continued)

OTHER PUBLICATIONS

International Search Report for PCT/CN2016/108243 dated Jan. 26, 2017 (PCT/ISA/210).

*Primary Examiner* — Padma Haliyur
(74) *Attorney, Agent, or Firm* — Sughrue Mion, PLLC

(57) ABSTRACT

A photographing module and electric bracket thereof. The electric bracket can be made into any shape, having not only a function of a traditional base that supports a motor, but also serving to dispose a circuit, so as to ensure stability and security of a circuit of the photographing module. The electric bracket can also integrate therein a drive coil or an EMI shielding conductive layer, so as to reduce a material loss and manufacturing cost, while increasing reliability of shielding protection.

13 Claims, 9 Drawing Sheets

(56) References Cited

U.S. PATENT DOCUMENTS

| | | | |
|---|---|---|---|
| 2010/0253834 A1* | 10/2010 | Ogane | H04N 5/2253 348/374 |
| 2010/0328525 A1 | 12/2010 | Lee et al. | |
| 2014/0028905 A1 | 1/2014 | Kim | |
| 2014/0043496 A1 | 2/2014 | Azuma | |
| 2014/0043519 A1* | 2/2014 | Azuma | G03B 3/10 348/345 |
| 2014/0043525 A1 | 2/2014 | Azuma et al. | |
| 2014/0253794 A1 | 9/2014 | Miyazaki et al. | |
| 2016/0191767 A1 | 6/2016 | Otani et al. | |

FOREIGN PATENT DOCUMENTS

| | | | |
|---|---|---|---|
| CN | 203722705 | U | 7/2014 |
| CN | 104580856 | A | 4/2015 |
| CN | 104755978 | A | 7/2015 |
| CN | 104954636 | A | 9/2015 |
| CN | 105093473 | A | 11/2015 |
| CN | 105472217 | A | 4/2016 |
| CN | 105472218 | A | 4/2016 |
| CN | 105472219 | A | 4/2016 |
| EP | 2 693 265 | A2 | 2/2014 |
| JP | 2007165460 | A | 6/2007 |
| JP | 2007336591 | A | 12/2007 |
| JP | 2009080166 | A | 4/2009 |
| JP | 2010-103628 | A | 5/2010 |
| JP | 2010-246007 | A | 10/2010 |
| JP | 2011035458 | A | 2/2011 |
| JP | 2012-34073 | A | 2/2012 |
| KR | 1020150061355 | A | 6/2015 |
| WO | 2014174931 | A | 10/2014 |

\* cited by examiner

PHOTOGRAPHING MODULE AND ELECTRIC BRACKET THEREOF

CROSS REFERENCE TO RELATED APPLICATIONS

This application is a national stage of International Application No. PCT/CN2016/108243, filed on Dec. 1, 2016, which claims priority to Chinese Patent Application No. 201510868840.4, filed on Dec. 1, 2015, Chinese Patent Application No. 201510868893.6, filed on Dec. 1, 2015, and Chinese Patent Application No. 201510868802.9, filed on Dec. 1, 2015. All of the aforementioned applications are hereby incorporated by reference in their entireties.

TECHNICAL FIELD

The present disclosure relates to the field of camera module, and more specifically to a camera module and an electrical bracket and a circuit setting method thereof, and also relates to a camera module structure with a design of a high-precision electrical bracket integrated with a drive coil or an EMI (Electro Magnetic Interference) shielding conductive layer, to reduce the size and space occupied by the assembly tolerance, improve the processing precision, and improve the reliability of the camera module.

BACKGROUND

With the rapid development of electronic products, they are increasingly important in daily life. In order to meet the market demand in space-saving and portability, electronic devices are becoming increasingly lighter and thinner, which requires the size of various components of the electronic devices, especially the thickness of each component to become smaller and smaller. For example, as one of the standard equipped components of the electronic devices, camera modules have a development trend of becoming light and thin.

The structure of a conventional manufactured and processed chip on board (COB) camera module is formed by assembling a rigid-flex combination board, a photosensitive chip, a lens base, a motor drive, and a lens assembly. The electronic components are arranged on the surface layer of the circuit board, and the components do not overlap each other. Along with the requirement for high-pixel and ultra-thin modules, the imaging requirement for the camera module is getting higher and higher. Thus, the assembly is more difficult and device specifications are higher. At the same time, as the pixels are getting higher, the chip area will increase accordingly, and the corresponding passive components such as the driving resistors and the capacitors increase accordingly, that is, the size of the module increases.

The existing mobile phone camera module package structure contradicts the demands on the thin-type and miniaturization of the camera module for the mobile phone. Therefore, it is necessary to invent a compact camera module and a new-type package process thereof to meet the needs of product development.

For the camera module based on the existing technology, in order to have a good supporting effect, the holder of the conventional camera module has to have a large size and occupy a large space, thereby increasing the size of the entire camera module. If the size of the holder is reduced for reducing the size of the camera module, the supporting effect of the holder may be affected.

In addition, only the circuit board of the conventional camera module is disposed at the bottom of the camera module, which is relatively far from the elements that require energy supply such as the motor and the photosensitive chip. Such disposition not only consumes more energy-conducting elements, such as wires, but also fails to provide an adequate and proper location design for the elements constituting the circuit in the entire circuit arrangement of the camera module as required, causing that the space occupied by the elements constituting the circuit is not properly reduced. That is, if the relative positions between the circuit board and other elements of the camera module are properly arranged, the space occupied by the necessary circuit elements of the camera module may be further reduced, thereby further reducing the size of the camera module. Certainly, the width or thickness of the camera module may also be selectively reduced according to the market demands.

In the conventional camera module assembly process, electronic elements such as capacitors, resistors, and integrated chips are components that need to be assembled and welded one by one. The assembly process includes: covering a steel mesh on the surface of the circuit board, brushing solder paste, placing and attaching the electronic elements one by one to the corresponding positions and reflow baking at 230° C.

FIG. 1 in the accompanying drawings illustrates an IC element mounting form based on the existing technology, wherein 101 refers to the circuit board. 102 refers to an IC element on the circuit board, i.e., a pad. 103 refers to the soldering tin. 104 refers to an IC element (including capacitor, resistor, driver chip, DSP chip, etc.).

The solder paste printing precision and the electronic element attaching precision are much less than the manufacturing precision of the circuit board. In addition, the pin and baking process of the elements has the risks of assembly offset, poor processing accuracy or high thickness, affecting the performance of the module.

In particular, in the conventional camera module assembly process, a drive motor is included. The drive motor is an independently assembled component including a housing, an elastic piece, a magnet, a carrier, a coil, a holder, and other components. The assembly process of the drive motor is to assemble sequentially the housing, the elastic piece, the magnet, the carrier, the coil and other components to the holder, and then fix the components by glue or welding to complete the assembly of the drive motor. However, the precision of such assembly process is far less than the processing and manufacturing precision of the camera module. Neither the manual assembly nor the mechanical automatic assembly can achieve a mass and rapid assembly. In addition, poor assembly precision or high thickness makes the size of the camera module easily and greatly fluctuate, causing difficulty in ensuring the quality.

In addition, FIG. 4 in the accompanying drawings of the specification illustrates a schematic structural diagram of a camera module according to the existing technology, wherein the camera module includes a lens assembly 1, a carrier 2, a voice coil motor 3, an optical filter 4, a photosensitive chip 5 and a circuit board 6. The lens assembly 1 is connected to the carrier 2. The lens assembly 1 and the carrier 2 are located in the middle of the voice coil motor 3. The optical filter 4 is located between the photosensitive chip 5 and the lens assembly 1. The photosensitive chip 5 and the optical filter 4 are supported by the circuit board 6. It is worth mentioning that the voice coil motor 3 includes a drive coil 31 that surrounds the carrier 2. The assembly of the entire camera module with such structure has a conductive package with a large dimensional tolerance, and is poor in the reliability of its own strength and the connection strength.

Although the camera module has been widely used in the current camera module field, it still has many drawbacks.

First, in the process of fabricating the camera module, the motor needs to be welded to the circuit board after the assembly of the camera module is completed, to achieve the conductible connection of the motor. The process is complex, and many additional problems may be caused by this welding process. For example, the product qualification rate is likely to be affected by the quality of the completion of the welding. Besides, this welded connection is not secure and can be easily damaged during use and maintenance.

Next, since a holder is disposed between the motor and the circuit board, the connection between the motor and the circuit board needs to cross the holder. The connection not only occupies space, but also is weak in firmness.

Next, using the conventional process, the external welded electrical connection between the motor and the holder is more susceptible to the external environment. For example, dust may affect its connection effect and service life.

As handheld smart devices such as smart phones and tablets, as well as smarter and lighter wearable smart devices, and even various types of Networks of Things application devices are generalized, the various devices must be light and thin on the one hand in order to meet the market demand in space-saving and portability. On the other hand, high-precision in photography is also required to enable fast input, recording, observation and identification functions, such as the use of the intelligence eyewear for observing roads instantaneously to aid in navigation, face recognition, or the use of the smart watch to scan 3D barcodes for obtaining further information. Therefore, in addition to the necessity to minimize the volume to comply with the trend, the camera modules that are equipped on these devices also need to ensure high precision and accuracy at the same time, to provide stably high-resolution images that are indispensable on many device applications.

In manufacturing the camera module, based on the conventional COB (Chip on Board) process, the camera module is formed by assembling a rigid-flex board, a photosensitive chip, a microscope base, a motor drive, and a lens assembly. The electronic components are arranged on the surface layer of the circuit board, and the components do not overlap each other. Along with the requirement for high-pixel and ultra-thin modules, while the volume of the camera module is reduced, the imaging requirement for the camera module is getting higher and higher. Thus, the assembly is more difficult. At the same time, as the pixels are getting higher, the chip area will increase accordingly, and corresponding passive components such as the driving resistors and the capacitors increase accordingly. As a result, the size of the module often inevitably becomes larger and larger, which further contradicts the demands on the thin-type and miniaturization of the existing smart device camera module package structure. Therefore, a solution for a compact camera module or a new-type package technology is in an urgent need to meet the trend of product development.

Although the above conventional manufacture process has been widely used in the current camera module field, it still has many drawbacks. First, in the process of manufacturing the camera module, the motor needs to be welded to the circuit board after the camera module is assembled in the lens assembly motor assembly, to achieve the conductible connection of the motor. The process is complex, and many additional problems may be caused by this welding process. For example, the product qualification rate is likely to be affected by the quality of the completion of the welding. At the same time, this welding is limited by the small size and high precision of the target subject, which makes the welding connection insecure and can be easily damaged during use and maintenance.

Next, since a holder is disposed between the motor and the circuit board, the connection between the motor and the circuit board needs to cross the holder. The connection not only occupies space, but also is weak in firmness. In addition, using the conventional process, the external welded electrical connection between the motor and the holder is more susceptible to the external environment. For example, dust may affect its connection effect and service life. In addition, in order to have a good supporting effect, the holder has to possess a large size and occupy a large space, thereby increasing the size of the entire camera module. If the size of the holder is reduced for reducing the size of the camera module, the supporting effect of the holder may be affected.

In addition, only the circuit board of the conventional camera module is disposed at the bottom of the camera module, which is relatively far from the elements that require energy supply such as the motor and the photosensitive chip. Such disposition only consumes more energy-conducting elements, such as wires, but also fails to provide an adequate and proper location design for the elements constituting the circuit in the entire circuit arrangement of the camera module as required, causing that space occupied by the elements constituting the circuit is not properly reduced. That is, if the relative positions between the circuit board and other elements of the camera module are properly arranged, the space occupied by the necessary circuit elements of the camera module may be further reduced, thereby further reducing the size of the camera module. Certainly, the width or thickness of the camera module may also be selectively reduced according to the market demands.

Meanwhile, after the camera module assembly is completed, based on the conventional process, an electromagnetic shielding component is also needed to be mounted to ensure that the camera module does not affect electromagnetic wave sources or devices other than itself during the operation process, so as to ensure that the camera module still has extremely high precision in the case of a minimized volume. Unfortunately, in the conventional practice, a metal housing, a conductive cloth, or a conductive copper foil is wrapped and embedded in the outer portion of the camera module, and then connected to the ground terminal of the camera module using a conductive glue or a conductive tape. The assembly precision is far less than the processing and fabrication precision of the camera module. Neither the manual assembly nor the mechanical automatic assembly can achieve a mass and rapid assembly. In addition, poor assembly precision or high thickness makes the size of the camera module of the final production easily and greatly fluctuate, causing difficulty in ensuring the quality, let alone pursuing the aforementioned thinness, lightness and precision.

In addition, based on the existing technology, as shown in FIG. 5, the existing method generally is to mount an independent electromagnetic shielding element 96 to the outer portion of the camera module 90 in a wrapping or nesting way after the camera module 90 is assembled. The electromagnetic shielding element 96 usually adopts a metal housing, a conductive cloth or a conductive copper foil, etc. After wrapping or nesting the outer portion of the camera module 90, the electromagnetic shielding element 96 is connected to the ground terminal of the camera module 90 by using a conductive glue or a conductive tape, thereby achieving the assembly of the electromagnetic shielding element 96. However, the precision of such assembly is often far less than the precision of the camera module 90 during processing and fabrication. Due to the poor assembly precision or high thickness, the size of the finished product of the camera module 90 often fluctuates greatly and the quality is difficult to ensure. Meanwhile, regardless of manual wrapping or mechanized automatic wrapping, the current practice cannot achieve mass and rapid processing and assembly in the electromagnetic shielding element 96.

SUMMARY

An objective of the present disclosure is to provide a camera module and an electrical bracket thereof, wherein the camera module includes a circuit, and the circuit is firmly disposed to fully ensure its stability.

Another objective of the present disclosure is to provide a camera module and an electrical bracket thereof, wherein the camera module includes a circuit, and the circuit is properly disposed to reduce the overall size of the camera module.

Another objective of the present disclosure is to provide a camera module and an electrical bracket thereof, wherein the camera module includes a circuit, and the circuit is properly protected from being polluted by the external environment, such as dust pollution.

Another objective of the present disclosure is to provide a camera module and an electrical bracket thereof, wherein the camera module includes a circuit, the circuit includes a series of electronic components and a series of conductors, and the electronic components and the conductors are firmly disposed at preset positions and can maintain their preset relative positions, thereby ensuring the stability of the circuit.

Another objective of the present disclosure is to provide a camera module and an electrical bracket thereof, wherein the camera module includes a circuit and an electrical bracket, and the circuit is firmly disposed on the electrical bracket.

Another objective of the present disclosure is to provide a camera module and an electrical bracket thereof, wherein the electrical bracket structure and the electronic components are assembled without structural components. Being directly assembled in an internal fitting way, the accuracy, cumulative offset, and tilt tolerance are reduced.

Another objective of the present disclosure is to provide a camera module and an electrical bracket thereof, wherein a conducting method replacing the solder paste with the conductive medium is used. Thus, the assembly accuracy is improved, the thickness is reduced, the solder paste pollution decreases, the module size is reduced, and the module quality and the manufacturing yield are improved.

Another objective of the present disclosure is to provide a camera module and an electrical bracket thereof, wherein the electronic components are embedded into the electrical bracket without using solder paste pins, thereby reducing the costs.

Another objective of the present disclosure is to provide a camera module and an electrical bracket thereof, wherein the electrical bracket has a protective function and may improve product reliability.

Another objective of the present disclosure is to provide a camera module and an electrical bracket thereof, wherein the back focus limitation of the conventional camera module may be reduced, and the thickness of the module may be reduced.

Another objective of the present disclosure is to provide a camera module and an electrical bracket thereof, wherein the camera module includes an electrical bracket, the electrical bracket may be made into an arbitrary shape, and is also used to set the circuit to reduce the size of the entire camera module, in addition to having the function of the conventional holder for supporting the motor.

Another objective of the present disclosure is to provide a camera module and an electrical bracket thereof, wherein the camera module includes an electrical bracket, the electrical bracket may be made into an arbitrary shape, and is also used to set the circuit to fully ensure the stability and safety of the circuit of the camera module, in addition to having the function of the conventional holder for supporting the motor.

Another objective of the present disclosure is to provide a camera module and an electrical bracket thereof, wherein the electrical bracket integrates the functions of the holder and the circuit board in the conventional camera module, making the structure more compact.

Another objective of the present disclosure is to provide a camera module and an electrical bracket thereof, wherein preset electronic components and conductive electronic components are disposed on the electrical bracket to form a preset circuit between the electrical components.

Another objective of the present disclosure is to provide a camera module and an electrical bracket thereof, wherein the camera module has a small structure size and a thin thickness.

Another objective of the present disclosure is to provide a camera module and an electrical bracket thereof, wherein electrical elements of the camera module are embedded in the electrical bracket, which spares steps of module manufacturing and processing, reduces process steps, and saves assembly costs.

Another objective of the present disclosure is to provide a camera module and an electrical bracket thereof, wherein the camera module has the advantages of small size and firm structure.

Another objective of the present disclosure is to provide a camera module and an electrical bracket thereof, wherein the resistors and capacitors of the camera module are embedded, which may avoid poor conductivity of the module caused by the solder resist, dust and the like in the areas of the resistors and capacitors, and improve the yield of the product.

Another objective of the present disclosure is to provide a camera module and an electrical bracket thereof, wherein the market competitiveness of the camera module is enhanced, thereby further enhancing the market competitiveness of electronic devices using the camera module.

An objective of the present disclosure is to provide a camera module and an electrical bracket thereof, wherein the electrical bracket includes an electrical bracket body and a drive coil, the drive coil is pre-fabricated in the electrical bracket body by directly adopting the drive coil fitting approach, which reduces the size space occupied by the assembly tolerance, and at the same time spares the labor and material loss of assembling one by one.

Another objective of the present disclosure is to provide a camera module and an electrical bracket thereof, wherein the drive coil is pre-fabricated in the electrical bracket to replace original structural components, so that the processing precision of the camera module may be improved and the length and thickness of the camera module may be reduced, and the peripheral size of the camera module is reduced accordingly, thereby improving the competitiveness and the customer satisfaction of the camera module when applied to various products.

Another objective of the present disclosure is to provide a camera module and an electrical bracket thereof, wherein the drive coil is pre-fabricated in the electrical bracket to achieve the function of protecting the camera module. In particular, since the structural design may be connected in various ways, in some embodiments, welding or gluing connection methods may not be used to further enhance product reliability.

Another objective of the present disclosure is to provide a camera module and an electrical bracket thereof, wherein the drive coil is pre-fabricated in the electrical bracket to replace the process of wrapping the rear part of the conventional conductive layer, thereby avoiding the increase of size, material loss and labor due to the wrapping, while increasing the reliability of shielding protection.

Another objective of the present disclosure is to provide a camera module and an electrical bracket thereof, wherein the drive coil is pre-fabricated in the electrical bracket to perform an external conductive connection with a voice coil motor (VCM), such as welding, conductive gluing, and overlapping connection, to further achieve electromagnetic interference (EMI) shielding protection in all directions of the camera module. Therefore, the camera module may further improve the shielding effect while ensuring the reliability at the maximum.

Another objective of the present disclosure is to provide a camera module and an electrical bracket thereof, wherein the camera module utilizes an electrical bracket as a holder in which an EMI shielding conductive layer is disposed and integrated in advance, to possess an electromagnetic shielding capability on its own. Thus, the camera module needs no additional wrapping or attaching of electromagnetic shielding elements or materials before being used.

Another objective of the present disclosure is to provide a camera module and an electrical bracket thereof, wherein the electrical bracket is formed with an EMI shielding cover, and the EMI shielding cover matches the electrical bracket body of the electrical bracket of the camera module to be directly assembled to the camera module, to generate an electromagnetic shielding effect on the camera module by combining the electrical bracket body of the electrical bracket.

Another objective of the present disclosure is to provide a camera module and an electrical bracket thereof, wherein the combining the EMI shielding cover and the electrical bracket to achieve the effect of electromagnetic shielding may use multiple connection methods such as welding, gluing, electroplating, sedimentation and spraying, thereby improving product reliability and reducing processes.

Another objective of the present disclosure is to provide a camera module and an electrical bracket thereof, wherein the camera module does not need additional wrapping or attaching of electromagnetic shielding elements, thereby reducing the assembly tolerance.

Another objective of the present disclosure is to provide a camera module and an electrical bracket thereof, wherein the camera module is light and thin.

Another objective of the present disclosure is to provide a camera module and an electrical bracket thereof, wherein the camera module has a high precision.

Another objective of the present disclosure is to provide a camera module and an electrical bracket thereof, wherein the electromagnetic shielding effect of the camera module is more reliable.

Another objective of the present disclosure is to provide a camera module and an electrical bracket thereof, wherein the assembly processes of the camera module is less.

Another objective of the present disclosure is to provide a camera module and an electrical bracket thereof, wherein the assembly of the camera module is relatively simple.

Another objective of the present disclosure is to provide a camera module and an electrical bracket thereof, wherein the assembly of the camera module reduces the wear of the electromagnetic shielding material.

Another objective of the present disclosure is to provide a camera module and an electrical bracket thereof, wherein the assembly efficiency of the camera module is increased.

Another objective of the present disclosure is to provide a camera module and an electrical bracket thereof, wherein the assembly costs of the camera module is reduced.

Another objective of the present disclosure is to provide a camera module and an electrical bracket thereof, wherein the camera module has high product competitiveness and satisfaction based on the above advantages.

Other advantages and features of the present disclosure will be apparent from the following description, and may be implemented by the solutions and combinations particularly pointed out in the claims.

In order to achieve at least one of the above objectives, the present disclosure provides a camera module, including:
an optical lens assembly;
a photosensitive chip;
a support device; and
a circuit;
wherein the photosensitive chip is capable of receiving lights passing through the optical lens assembly, the circuit is firmly disposed on the support device to form an electrical bracket, and the photosensitive chip is conductively connected to the circuit of the electrical bracket.

In some embodiments, the circuit includes multiple electronic components and a set of conductors, and the set of conductors are conductively connected to the electronic components in a preset way.

In some embodiments, the circuit further includes a series of connecting elements, and the connecting elements conduct the electronic components and the conductors to the photosensitive chip.

In some embodiments, the support device includes a support body, and the electronic components are disposed on the support body.

In some embodiments, the electronic components are embedded in the support body.

In some embodiments, the conductors are disposed on the support body.

In some embodiments, the conductors are embedded in the support body.

In some embodiments, the support body has a bracket body surface, and the connecting elements are disposed on the support body, where a conductive connection between the connecting elements and the photosensitive chip is performed on the bracket body surface.

In some embodiment, the connecting elements are disposed on the bracket body surface of the support body.

In some embodiments, the circuit includes multiple electronic components and a series of connecting elements, and the electronic components are conductively connected to the photosensitive chip via the connecting elements.

In some embodiments, the support device includes a support body, and the electronic components are disposed on the support body.

In some embodiments, the electronic components are embedded in the support body.

In some embodiments, the electronic components are selected from a capacitor, a resistor, a driver chip, and a DSP chip and a combination thereof.

In some embodiments, the connecting elements are selected from a pad and a pin.

In some embodiments, the camera module further includes an optical filter, and the optical filter is disposed between the optical lens assembly and the photosensitive chip.

In some embodiments, the camera module further includes a motor, the photosensitive lens assembly is disposed on the motor, and the motor is supported on the support device.

In some embodiments, the motor is conductively connected to the circuit.

In some embodiments, the camera module further includes a flexible circuit board, and the flexible circuit board is conductively connected to the circuit.

In some embodiments, the connecting elements includes a series of photosensitive chip connecting components for conductively connecting the photosensitive chip to the electronic components.

In some embodiments, the connecting elements further include a series of circuit board connecting components for conductively connecting the flexible circuit board to the electronic components.

In some embodiments, the connecting elements further include a series of motor connecting components for conductively connecting the motor to the electronic components.

According to another aspect of the present disclosure, the present disclosure further provides an electrical bracket for a camera module, including:

a support device; and a circuit;

wherein the circuit includes multiple electronic components and a set of conductors, the set of conductors is conductively connected to the electronic components in a preset way, and the circuit is firmly disposed on the support device.

According to another aspect of the present disclosure, the present disclosure further provides a camera module, including:

an electrical bracket, including an electrical bracket body and a drive coil, wherein the drive coil is integrated in the electrical bracket body;

a photosensitive chip, being electrically connected to the electrical bracket body;

an optical lens assembly, located on a photosensitive path of the photosensitive chip;

a carrier, carrying the optical lens assembly; and one or more magnets, evenly disposed on the carrier, where when the optical lens assembly is mounted on the electrical bracket through the carrier, the optical lens assembly performs auto focusing under a driving action of the magnet and the drive coil.

In some embodiments, the camera module includes a flexible circuit board connected to the electrical bracket for connecting the photosensitive chip.

In some embodiments, the camera module includes an optical filter disposed between the photosensitive chip and the optical lens assembly, and supported by the electrical bracket body.

In some embodiments, the electrical bracket body includes a base and a top wall, the annular top wall extends from the base, the photosensitive chip is mounted on the base, the drive coil is embedded in the top wall, or further embedded and extended into the base.

In some embodiments, the electrical bracket body includes a base, the photosensitive chip is mounted on the base, the drive coil includes a drive coil circuit and a drive coil body, the drive coil circuit is disposed on the base, and the drive coil body is electrically connected to the drive coil circuit and located on a top side of the base to surround the carrier.

In some embodiments, the drive coil circuit is embedded in the base.

In some embodiments, the drive coil implements electromagnetic interference shielding protection of the camera module.

In some embodiments, the drive coil is selected from one of a monolayer metal, a multilayer metal, a conductive non-metal whole piece, a conductive non-metal mesh, or a parallel array structure.

In some embodiments, a fabrication method of the drive coil is selected from electroplating, sedimentation, spraying, welding or gluing.

According to another aspect of the present disclosure, the present disclosure provides a method for fabricating a camera module, including the following steps:

(S01) pre-fabricating a drive coil in an electrical bracket;

(S02) disposing one or more magnets evenly on a carrier;

(S03) mounting an optical lens assembly on the carrier;

(S04) connecting electrically a photosensitive chip to the electrical bracket;

(S05) disposing an optical filter on the electrical bracket; and (S06) mounting the optical lens assembly connected to the carrier to the electrical bracket.

It may be understood that there is no strict sequence for the above fabrication method.

Preferably, in the above method, the drive coil is selected from a monolayer metal, a multilayer metal, or a conductive non-metal whole piece, a conductive non-metal mesh, or a parallel array structure.

Preferably, in the above method, the electrical bracket integrates the functions of the holder and the circuit board for supporting and connecting the optical filter, the photosensitive chip and the carrier.

According to another aspect of the present disclosure, the present disclosure provides an electrical bracket integrated with a drive coil, including:

an electrical bracket body; and a drive coil, being integrated in the electrical bracket body and electromagnetically induced with a magnet of a camera module to form a drive motor for driving an optical lens assembly of the camera module to move.

The present disclosure further provides an electrical bracket having an EMI shielding conductive layer applied to a camera module, including:

an electrical bracket body integrally provided with a circuit; and an EMI shielding conductive layer, disposed on the electrical bracket body to form an integral structure with the electrical bracket body, wherein a photosensitive chip of the camera module is conductively connected to the circuit of the electrical bracket body and disposed in the electrical bracket body, and the EMI shielding conductive layer provides a shielding effect against electromagnetic interference.

In some embodiments, the camera module is a fixed focus camera module, and a lens assembly of the camera module is connected to the electrical bracket body of the electrical bracket.

In some embodiments, the electrical bracket body includes a base and a top wall, the lens assembly is located in the top wall, and the photosensitive chip is assembled in the base.

In some embodiments, the camera module is an autofocus camera module, the camera module further includes a motor conductively connected to the electrical bracket, the electrical bracket includes a base and a top wall, wherein the photosensitive chip is disposed in the base, the top wall extends from the base, and the motor is located in the top wall.

In some embodiments, the EMI shielding conductive layer forms an integral structure with the base and the top wall.

In some embodiments, the camera module is an autofocus camera module, the camera module further includes a motor conductively connected to the electrical bracket, the electrical bracket includes a base, wherein the photosensitive chip is disposed in the base, the EMI shielding conductive layer forms an integral structure with the base, and the camera module further includes an EMI shielding cover disposed around the motor and located on a top side of the base.

In some embodiments, the EMI shielding conductive layer is connected to the EMI shielding cover to form an integral shielding structure.

In some embodiments, the EMI shielding conductive layer is an integral structure or a structure of multiple independent pieces.

In some embodiments, the EMI shielding conductive layer is a monolayer structure, a multilayer structure, a mesh structure or a parallel array structure.

In some embodiments, the EMI shielding conductive layer is made of a metal material, a conductive non-metal material, or a composite material of metal and non-metal.

In some embodiments, the EMI shielding conductive layer is disposed at a position of the electrical bracket, the position being one or a combination of a bottom of the camera module, a side annular wrapping, and a top surface opening.

In some embodiments, the EMI shielding conductive layer is entirely embedded in the electrical bracket body, or partially embedded in the electrical bracket body, or located in an outer side of the electrical bracket body.

In some embodiments, the EMI shielding conductive layer is fabricated by electroplating, sedimentation, spraying, welding, gluing or die casting.

In some embodiments, the EMI shielding conductive layer and the EMI shielding cover are welded, conductively glued or overlappingly connected.

According to another aspect of the present disclosure, the present disclosure provides a camera module, including:

a lens assembly;

a photosensitive chip, wherein the lens assembly is located on a photosensitive path of the photosensitive chip; and an electrical bracket, including an electrical bracket body and an EMI shielding conductive layer, wherein the EMI shielding conductive layer is disposed on the electrical bracket body to form an integral structure with the electrical bracket body, the photosensitive chip is conductively connected to the electrical bracket body and disposed in the electrical bracket body, and the EMI shielding conductive layer provides a shielding effect against electromagnetic interference.

These and other objectives, features, and advantages of the present disclosure will become apparent from the following detailed description, the accompanying drawings, and the claims.

DETAILED DESCRIPTION OF EMBODIMENTS

The following description is provided to disclose the present disclosure to enable those skilled in the art to implement the present disclosure. Preferred embodiments are provided in the following description only as examples and modifications will be apparent to those skilled in the art. The general principles of the present disclosure defined in the following description may be applied to other embodiments, alternatives, modifications, equivalents, and other technical solutions without departing from the spirit and scope of the present disclosure.

Figure 1:
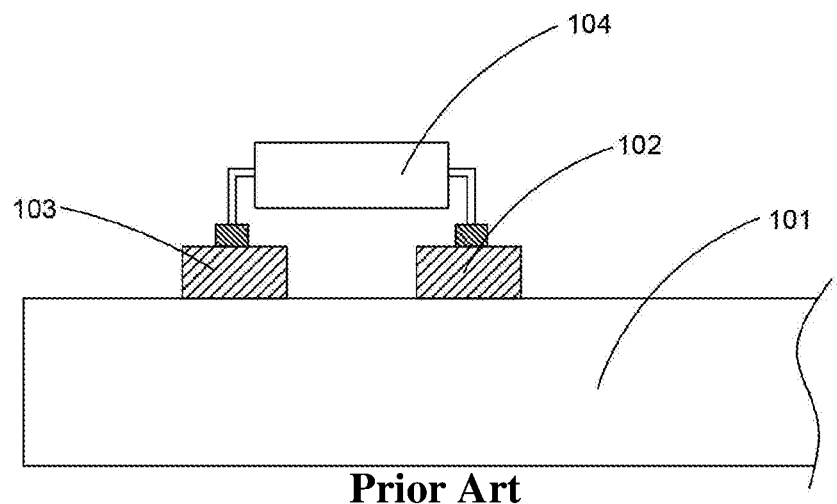
FIG. 1 is a method for setting a circuit of a camera module according to the existing technology.
Figure 2A:
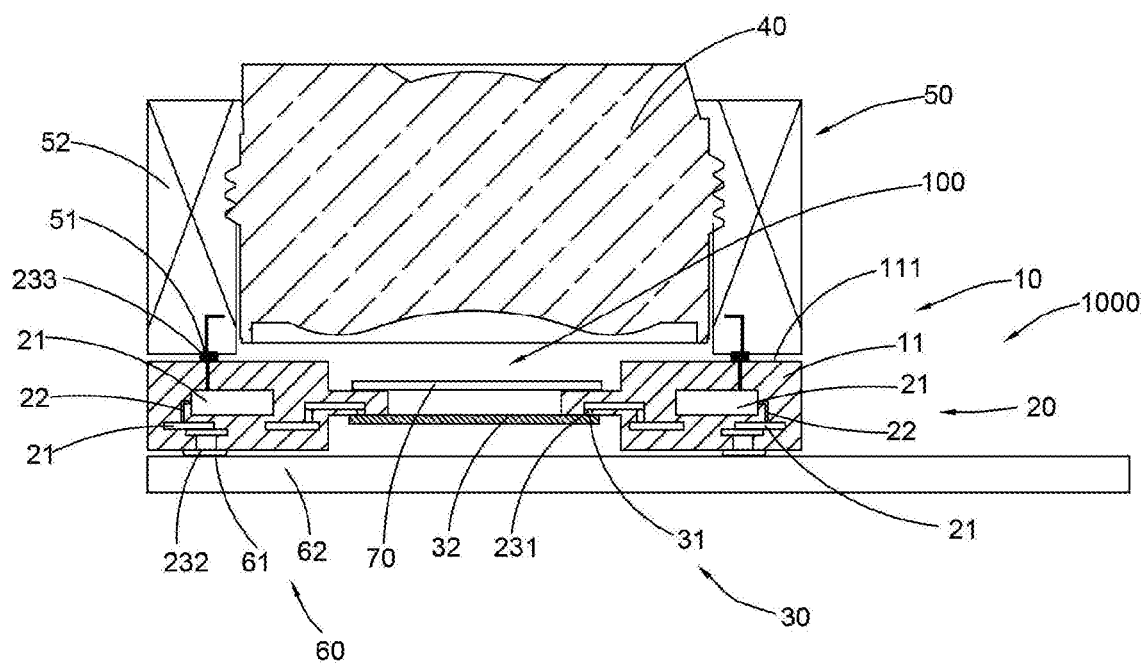
FIG. 2A is a cross-sectional view of a camera module according to a first preferred embodiment of the present disclosure.
Figure 2B:
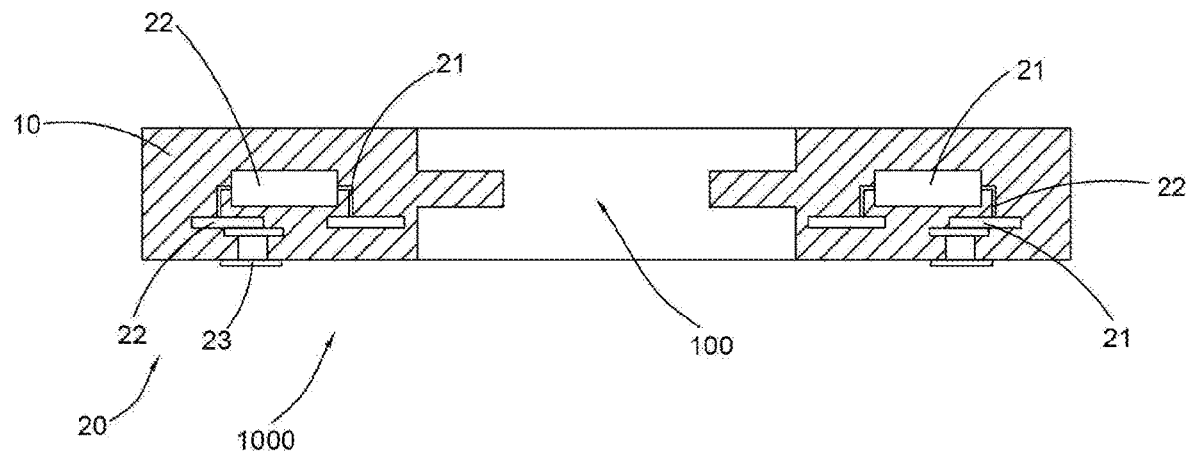
FIGS. 2B-2C illustrate a method for setting a bracket of the camera module and a circuit of the camera module according to the above first preferred embodiment of the present disclosure.
Figure 2C:
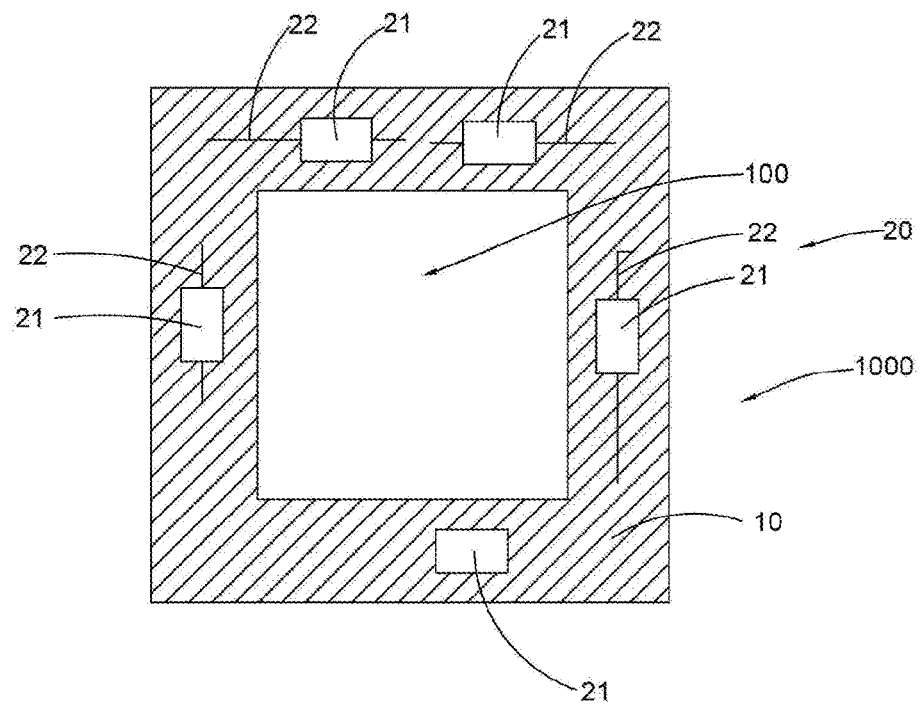

FIGS. 2A-2C illustrate a camera module according to a first preferred embodiment of the present disclosure. The camera module includes a support device 10, a circuit 20, a photosensitive chip 30, an optical lens assembly 40, a motor 50, and a flexible circuit board 60.

The optical lens assembly 40 is mounted to the motor 50, and the optical lens assembly 40 may be driven by the motor 50 to be suitable for auto focusing. The flexible circuit board 60 and the motor 50 are disposed on different sides of the support device 10 so that the optical lens assembly 40 is located on the photosensitive path of the photosensitive chip 30. Thus, when the camera module is used for capturing an image of an object, lights reflected by the object can be received by the photosensitive chip 30 after being processed by the optical lens assembly 40 to be suitable for photoelectric conversion. That is, in the present disclosure, the support device 10 may be used to connect the flexible circuit board 60 and the motor 50. That is, the support device 10 integrates functions of the holder and the circuit board of a conventional camera module to assemble the motor lens assembly and connect the photosensitive chip as the flexible circuit board.

The circuit 20 is used to conduct various electrical elements of the camera module, such as the motor 50 and the photosensitive chip 30, and enable these electrical elements to achieve their respective functions. For example, the motor 50 may drive the optical lens assembly 40 to focus the camera module.

The support device 10 includes a support body 11 and has a clear aperture 100. The clear aperture 100 is disposed on the bracket body 11. The circuit 20 includes multiple electronic components 21, a set of conductors 22 and a series of connecting elements 23, wherein the set of conductors 22 are conductively connected to the electronic components 21 in a preset way and implements conductive connections with the motor 50, the flexible circuit board 60 and the photosensitive chip 30 via the connecting elements 23, to form the circuit 20 of the camera module, so that the camera module has the preset function.

According to the first preferred embodiment of the present disclosure, the electronic components 21 may be selected from but not limited to capacitors, resistors, driver chips, and DSP chips.

According to the first preferred embodiment of the present disclosure, the electronic components 21 and the conductors 22 are embedded in the support body 11 made of laminated resin, wherein the connecting elements 23 are disposed on the support body 11. According to the first preferred embodiment of the present disclosure, the circuit 20 and the support device 10 together form an electrical bracket 1000. The electrical bracket 1000 formed by the circuit 20 and the support device 10 as a whole can support the components of the camera module as the holder of the conventional camera module, and also can help each component of the camera module to perform an electrical conduction. Since the electronic components 21 and the conductors 22 of the circuit 20 are embedded in the support body 11, the circuit 20 is properly arranged, and the size of the electrical bracket 1000 is equivalent to or smaller than the size of the holder of the conventional camera module but is able to integrate more functions, which satisfies the market demand for thin and light electronic equipments.

It is worth mentioning that the embedded design of the electronic components 21 and the conductors 22 is more space-efficient and has many advantages. First, the electronic components 21 and the conductors 22 are embedded in the support body 11, such that they do not need to be exposed to the external environment and are not affected by the external environment, such as dust, to obtain more protection and extend the service life. Therefore, the service life of the electrical bracket 1000 and the entire camera module is extended. Next, the electronic components 21 and the conductors 22 are embedded in the support body 11, and are fixedly disposed so as not to interfere with each other due to the influence of the external environment. Thirdly, compared with the conventional electronic component mounting process, this embedded arrangement has convenience, high precision, low deviation and good performance. Fourth, the arrangement of the conductors 22 is more reasonable, and the disordered circuit arrangement such as the disorder of the wires is not caused due to the complicated structure of the circuit 20.

According to the first preferred embodiment of the present disclosure, the camera module further includes an optical filter 70, wherein the optical filter 70 is used to filter out stray lights to further improve the image quality. The optical filter 70 is disposed between the optical lens assembly 40 and the photosensitive chip 30.

The disposition position of the photosensitive chip 30 matches the position of the clear aperture 100.

The photosensitive chip 30 is electrically connected to the support device 10. Specifically, the photosensitive chip 30 includes a series of photosensitive chip guides 31 and a photosensitive chip body 32, wherein the photosensitive chip guides 31 are disposed on the photosensitive chip body 32.

According to the first preferred embodiment of the present disclosure, the connecting elements 23 of the circuit are disposed on the support body 11 of the support device 10. More specifically, the support body 11 has a bracket body surface 111, wherein the connecting elements 23 are disposed on the bracket body surface 111 to facilitate the circuit 20 to conduct with other components of the camera module via the connecting elements 23, such as the photosensitive chip 30 and the motor 50 according to the first preferred embodiment of the present disclosure, to enable the camera module to be adjusted and controlled and have the preset function to improve its quality.

According to the first preferred embodiment of the present disclosure, the connecting elements 23 include a series of photosensitive chip connecting components 231, wherein the photosensitive chip guides 31 and the corresponding photosensitive chip connecting components 231 are conductively connected to implement the interconnected conduction between the photosensitive chip 30 and the circuit 20.

According to the first preferred embodiment of the present disclosure, the photosensitive chip connecting components 231 are specifically implemented as photosensitive chip pads. The photosensitive chip pads are welded to the photosensitive chip 30. It should be understood by those skilled in the art that such mounting arrangement and such welding connection are merely examples of the present disclosure and not limitations thereof. The connection between the photosensitive chip pads and the photosensitive chip 30 may be implemented as but not limited to welding. It is worth mentioning that according to the first preferred embodiment of the present disclosure, the photosensitive chip 30 of the camera module adopts the photosensitive flip-chip solution.

It is worth mentioning that during the design process of the camera module, the shape of the support body 11 may be set as needed.

As shown in the figure, the support device 10 and the flexible circuit board 60 are conductively connected. Specifically, the connecting elements 23 of the support device 10 also includes a series of circuit board connecting components 232. The flexible circuit board 60 includes a series of circuit board guides 61 and a circuit board body 62, wherein the circuit board guides 61 are disposed on the circuit board body 62. The circuit board guides 61 are conductively connected to the corresponding circuit board connecting components 232 to implement the conductive connection between the circuit 20 and the flexible circuit board 60, so that the electrical bracket can be electrically connected to the power supply device.

According to the first preferred embodiment of the present disclosure, the support device 10 is mounted on the flexible circuit board 60 so that the support device 10 is conductively connected to the circuit 20 while being supported stably by the flexible circuit board 60. It is worth mentioning that the position of the circuit board guides 61 on the circuit board body 62 matches the position of the circuit board connecting components 232 on the support device 10. When the flexible circuit board 60 is mounted on the support device 10, the flexible circuit board 60 can be conductively connected to the circuit 20. The circuit board guides 61 are conductively connected to the circuit board connecting components 232 on the support device 10, and the conductive connection method may be but not limited to welding.

According to the first preferred embodiment of the present disclosure, the circuit board connecting components 232 are specifically implemented as circuit board pads. The electrical bracket 1000 is welded to connect the flexible circuit board 60. It should be understood by those skilled in the art that such mounting arrangement and such welding connection are merely examples of the present disclosure and not limitations thereof. The connection between the support device 10 and the flexible circuit board 60 may be implemented as but not limited to welding.

The connecting elements 23 further includes a series of motor connecting components 233, wherein the motor connecting components 233 are disposed on the bracket body surface 111. According to the first preferred embodiment of the present disclosure, the motor connecting components 233 are specifically implemented as a motor pad. The motor pad is used to conductively connect the motor 50 to the circuit 20 so that the motor 50 can be driven to drive the optical lens assembly 40 to adjust the camera module.

The motor 50 includes a series of motor guides 51 and a motor body 52, wherein the motor guides 51 are disposed on the motor body 52. It is worth mentioning that the position of the motor guides 51 on the motor body 52 matches the position of the motor connecting components 233 on the support device 10. When the motor 50 is disposed on the support device 10, the motor 50 can be conductively connected to the circuit 20. More specifically, the motor guides 51 are conductively connected to the motor connecting components 233 on the support device 10, and the conductive connecting method may be but not limited to ACP (anisotropic conductive adhesive), ultrasonic welding, thermocompression welding, and reflow soldering.

It is worth mentioning that the flexible circuit board 60 and the support device 10 which are formed separately are merely an example of the present disclosure and not a limitation thereto. According to other embodiments of the present disclosure, the flexible circuit board 60 and the support device 10 may alternatively be formed as one body. In addition, the respective shapes or overall shape of the flexible circuit board 60 and the support device 10 may also be arbitrarily set as needed.

It is worth mentioning that the connecting elements 23 may be specifically implemented as a pad or a pin, but not limited to a pad and a pin. The present disclosure is not limited in this regard.

Those skilled in the art can understand that the connecting elements 23 described above and the arrangement thereof are merely examples of the present disclosure and not limitations thereto. Any embodiment that can achieve the objective of the present disclosure belongs to the scope of the present disclosure.

It is worth mentioning that, according to the first preferred embodiment of the present disclosure, the electronic components 21 and the conductors 22 of the circuit 20 being embedded in the support body 11 is merely an example of the present disclosure and not a limitation thereto. According to other embodiments of the present disclosure, only one part of the electronic components 21 and the conductors 22 may be embedded in the support body 11 and the other part may be disposed in other places, such as disposed on the surface of the support body 11. Those skilled in the art should understand that the present disclosure provides an arrangement of the electronic components and conductors, but it does not mean that all the electronic components and conductors of the camera module must be embedded in the bracket body. Specific arrangements may be set according to specific needs.

According to the first preferred embodiment of the present disclosure, the electrical bracket 1000 includes IC elements and wires, that is, the wires conventionally laid on the circuit board are integrated in the electrical bracket, and only a small amount of wires need to be laid on the circuit board.

According to the first preferred embodiment of the present disclosure, based on the COB process, the mounting process of the IC elements in the SMT process is reduced, and the IC elements are integrated into the support device 10 to form the electrical bracket 1000.

It is worth mentioning that according to the first preferred embodiment of the present disclosure, the connecting elements 23 of the circuit 20 being disposed on the surface of the support body 11 is merely an example of the present disclosure and not a limitation thereto. According to other embodiments of the present disclosure, the connecting elements 23 may also have other arrangements.

Figure 3A:
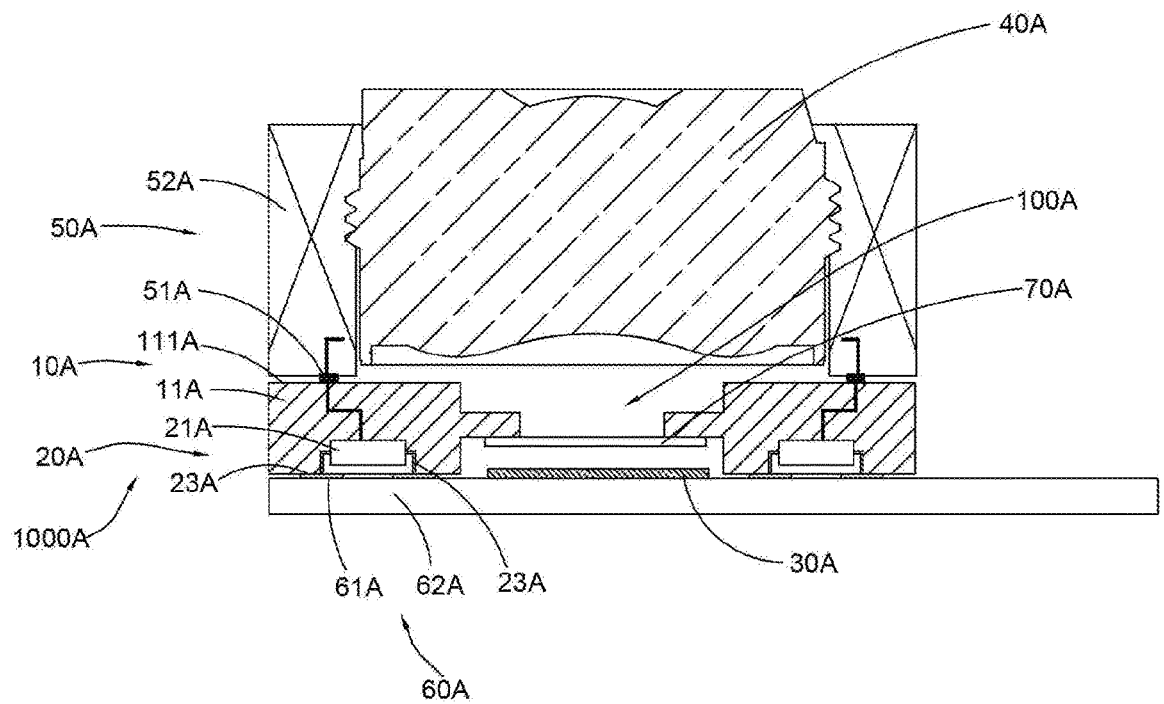
FIG. 3A is a cross-sectional view of a camera module according to a second preferred embodiment of the present disclosure.
Figure 3B:
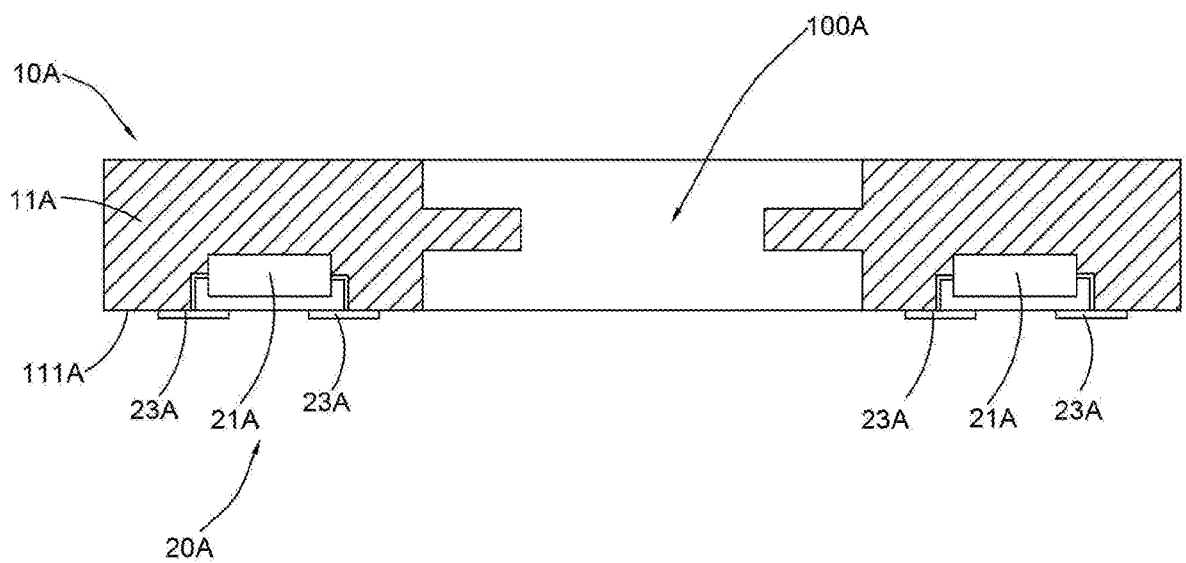
FIGS. 3B-3C illustrate a method for setting a bracket of the camera module and a circuit of the camera module according to the above second preferred embodiment of the present disclosure.
Figure 3C:
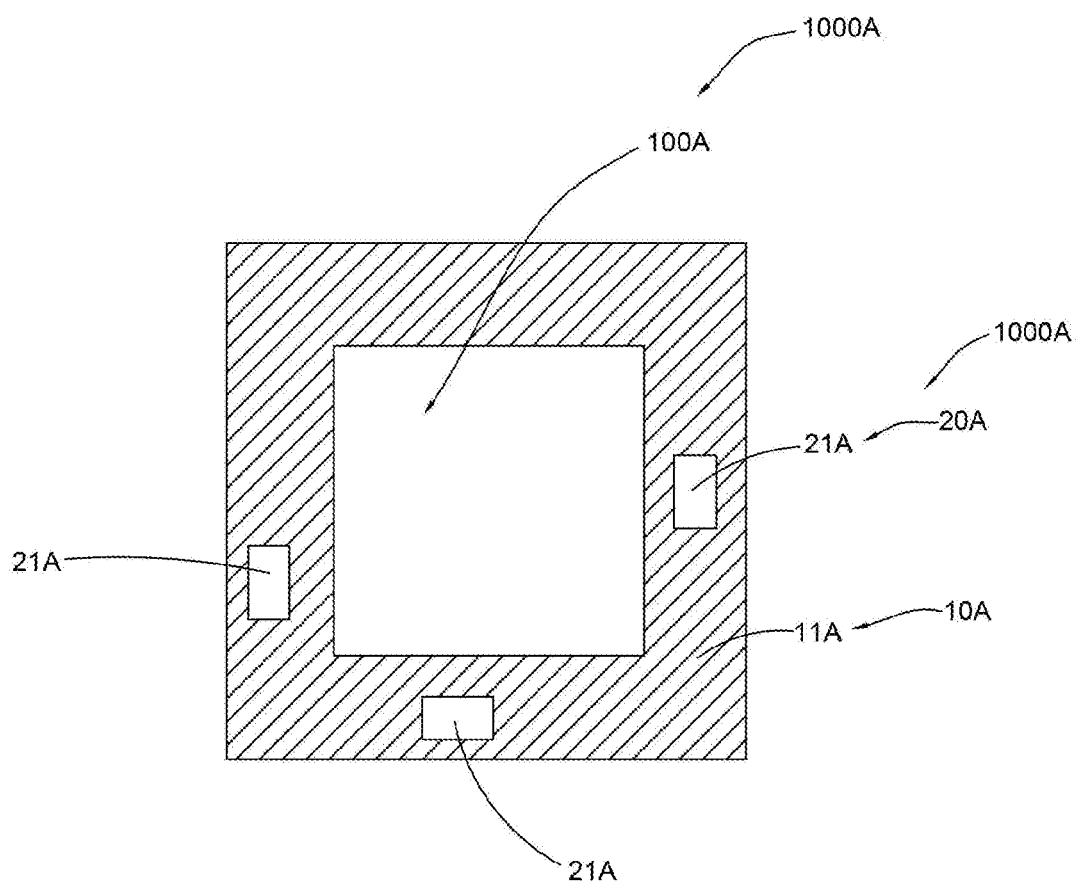
Figure 4:
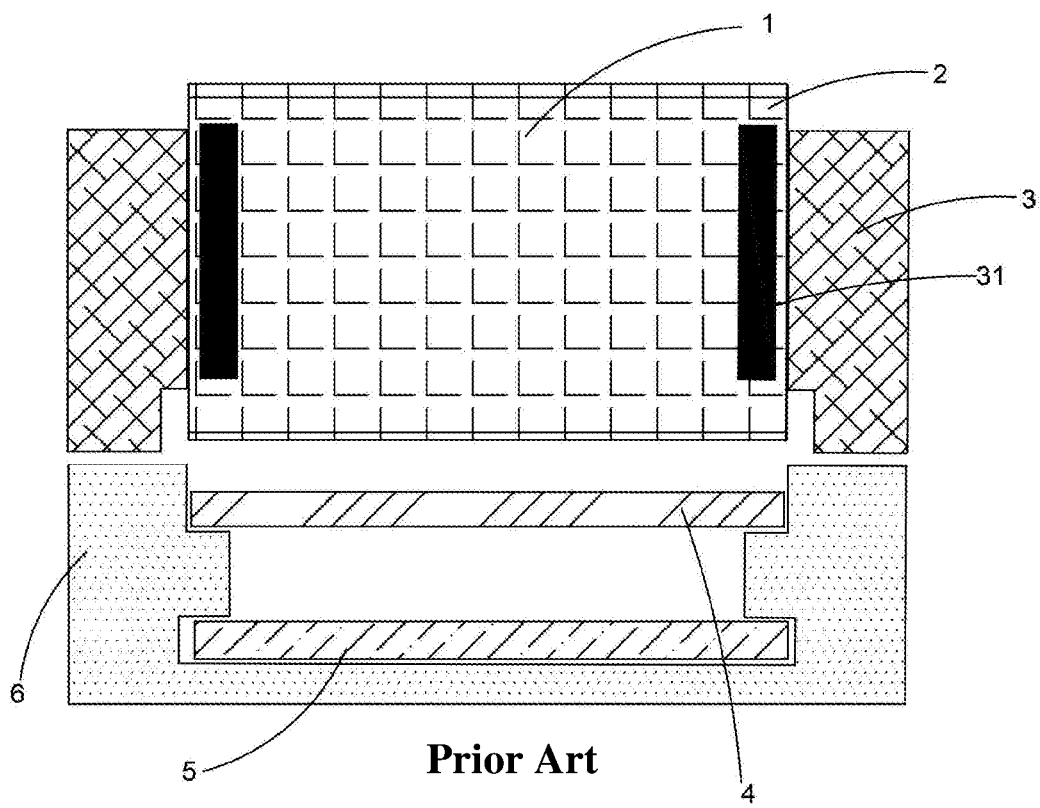
FIG. 4 is a schematic structural diagram of a camera module containing a drive coil in the existing technology.
Figure 5:
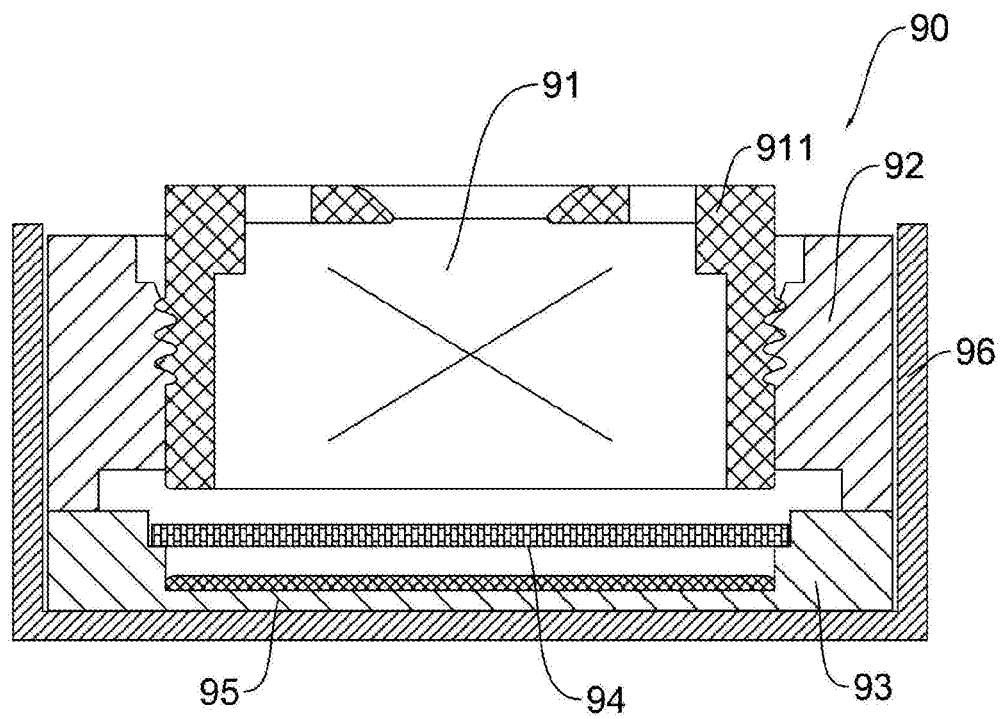
FIG. 5 is a schematic cross-sectional view of a camera module and an electromagnetic shielding component according to the existing technology.

FIGS. 3A-3C illustrate a camera module according to a second preferred embodiment of the present disclosure. The camera module includes a support device 10A, a circuit 20A, a photosensitive chip 30A, an optical lens assembly 40A, a motor 50A, and a flexible circuit board 60A.

The optical lens assembly 40A is mounted to the motor 50A, and the optical lens assembly 40A may be driven by the motor 50A to be suitable for auto focusing. The flexible circuit board 60A and the motor 50A are disposed on different sides of the support device 10A so that the optical lens assembly 40A is located on the photosensitive path of the photosensitive chip 30A. Thus, when the camera module is used for capturing an image of an object, lights reflected by the object can be received by the photosensitive chip 30A after being processed by the optical lens assembly 40A to be suitable for photoelectric conversion. That is, in the present disclosure, the support device 10A may be used to connect the flexible circuit board 60A and the motor 50A. That is, the support device 10A integrates functions of the holder and the circuit board of a conventional camera module to assemble the motor lens assembly and connect the photosensitive chip and the flexible circuit board.

The circuit 20A is used to conduct various electrical elements of the camera module, such as the motor 50A and the photosensitive chip 30A, and enable these electrical elements to achieve their respective functions. For example, the motor 50A may drive the optical lens assembly 40A to focus the camera module.

The support device 10A includes a support body 11A and has a clear aperture 100A. The clear aperture 100A is disposed on the bracket body 11A. The circuit 20A includes multiple electronic components 21A and a series of connecting elements 23A, wherein the electronic components 21A are conductively connected to the motor 50A, the flexible circuit board 60A and the photosensitive chip 30A via the connecting elements 23A, to form the circuit 20A of the camera module, so that the camera module has the preset function.

According to the second preferred embodiment of the present disclosure, the electronic components 21A may be selected from but not limited to capacitors, resistors, driver chips, and DSP chips.

According to the second preferred embodiment of the present disclosure, the electronic components 21A are embedded in the support body 11A, wherein the connecting elements 23A are disposed on the support body 11A. According to the second preferred embodiment of the present disclosure, the circuit 20A and the support device 10A together form an electrical bracket 1000A. The electrical bracket 1000A formed by the circuit 20A and the support device 10A as a whole can support the components of the camera module as the holder of the conventional camera module, and also can help each component of the camera module to perform electrical conduction. Since the electronic components 21A of the circuit 20A are embedded in the support body 11A, the circuit 20A is properly arranged, the size of the electrical bracket 1000A is equivalent to or smaller than the size of the holder of the conventional camera module but is able to integrate more functions, which satisfies the market demand for thin and light electronic equipments.

It is worth mentioning that the embedded design of the electronic components 21A is more space-efficient and has many advantages. First, the electronic components 21A are embedded in the support body 11A, such that they do not need to be exposed to the external environment and are not affected by the external environment, such as dust, to obtain more protection and extend the service life. Therefore, the service life of the electrical bracket 1000A and the entire camera module is extended. Next, the electronic components 21A are embedded in the support body 11A, and are fixedly disposed so as not to interfere with each other due to the influence of the external environment. Thirdly, compared with the conventional electronic component mounting process, this embedded arrangement has convenience, high precision, low deviation and good performance.

According to the second preferred embodiment of the present disclosure, the camera module further includes an optical filter 70A, wherein the optical filter 70A is used to filter out stray lights to further improve the image quality. The optical filter 70A is disposed between the optical lens assembly 40A and the photosensitive chip 30A.

The disposition position of the photosensitive chip 30A matches the position of the clear aperture 100A.

The photosensitive chip 30A is electrically connected to the support device 10A. Specifically, the photosensitive chip 30A includes a series of photosensitive chip guides 31A and a photosensitive chip body 32A, wherein the photosensitive chip guides 31A are disposed on the photosensitive chip body 32A.

According to the second preferred embodiment of the present disclosure, the connecting elements 23A of the circuit are disposed on the support body 11A of the support device 10A. More specifically, the support body 11A has a bracket body surface 111A, wherein the connecting elements 23A are disposed on the bracket body surface 111A to facilitate the circuit 20A to conduct with other components of the camera module via the connecting elements 23A, such as the photosensitive chip 30A and the motor 50A according to the second preferred embodiment of the present disclosure, to enable the camera module to be adjusted and controlled and have a preset function to improve its quality.

It is worth mentioning that during the design process of the camera module, the shape of the support body 11A may be set as needed.

As shown in the figure, the support device 10A and the flexible circuit board 60A are conductively connected and are conductively connected to a power supply device.

According to the second preferred embodiment of the present disclosure, the support device 10A is mounted on the flexible circuit board 60A so that the support device 10A is conductively connected to the circuit 20A while being supported stably by the flexible circuit board 60A. The conductive connection method of the circuit board guides 61A to the support device 10A may be but not limited to welding.

The electrical bracket 1000A is welded to connect the flexible circuit board 60A. It should be understood by those skilled in the art that such mounting arrangement and such welding connection are merely examples of the present disclosure and not limitations thereof. The connection between the support device 10A and the flexible circuit board 60A may be implemented as but not limited to welding.

The motor 50A includes a series of motor guides 51A and a motor body 52A, wherein the motor guides 51A are disposed on the motor body 52A. The motor guides 51A are conductively connected to the connecting elements 23A of the circuit 20A, and the conductive connecting method may be but not limited to ACP (anisotropic conductive adhesive), ultrasonic welding, thermocompression welding, and reflow soldering.

It is worth mentioning that the connecting elements 23A may be specifically implemented as a pad or a pin, but not limited to a pad and a pin. The present disclosure is not limited in this regard.

According to the second preferred embodiment of the present disclosure, the electrical bracket 1000A of the camera module includes only IC elements and does not include wires. The pad on the bottom surface of the electrical bracket is directly connected to the IC elements. In this design, wires still needs to be laid on the flexible circuit board 60A, but the IC elements conventionally located on the circuit board may be integrated into the electrical bracket 1000A. The back focus of this module may be greatly reduced.

It is worth mentioning that the flexible circuit board 60A and the support device 10A which are formed separately merely as an example of the present disclosure and not a limitation thereto. According to other embodiments of the present disclosure, the flexible circuit board 60A and the support device 10A may alternatively be formed as one body. In addition, the respective shapes or the overall shape of the flexible circuit board 60A and the support device 10A may also be arbitrarily set as needed.

Figure 6:
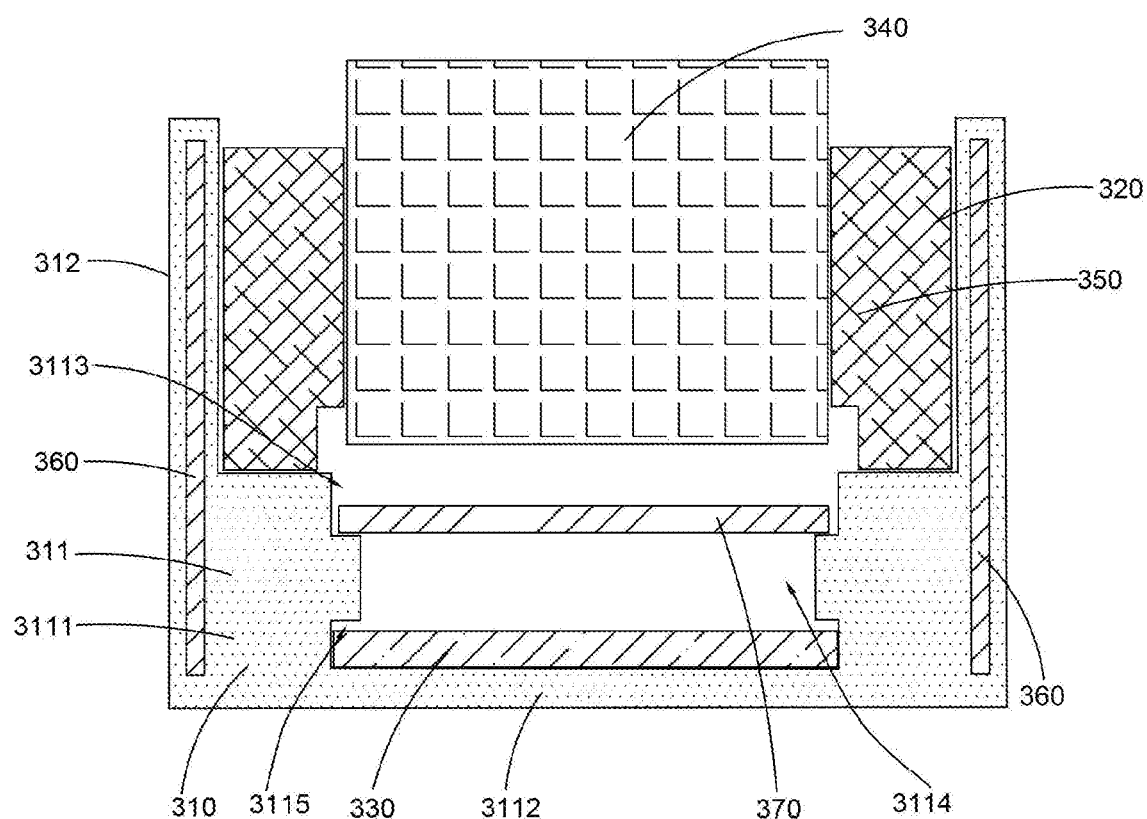
FIG. 6 is a schematic diagram of a camera module according to a third preferred embodiment of the present disclosure.

As shown in FIG. 6, a camera module according to a third preferred embodiment of the present disclosure is provided. The camera module includes an electrical bracket body 310, a carrier 320, a photosensitive chip 330, an optical lens assembly 340, one or more magnets 350, and a drive coil 360. The multiple magnets 350 are evenly disposed on the carrier 320. In the present disclosure, the electrical bracket includes the electrical bracket body 310 and the drive coil 360, that is, the electrical bracket of the present disclosure integrates the drive coil 360. The drive coil 360 of the conventional camera module is integrated in the electrical bracket of the present disclosure, and other structures of a drive motor are independent of the electrical bracket and are used to assemble the optical lens assembly 340. That is, the structures of the drive coil 360, the carrier 320, and the magnets 350 form the drive motor.

The optical lens assembly 340 is mounted on the carrier 320. The carrier 320 may drive the optical lens assembly 340 to move for performing an autofocus by the electromagnetic induction of the magnet 350 and the drive coil 360. That is, the carrier 320 may be a structure of a conventional drive motor, which can cooperate with the optical lens assembly 340 and drive the optical lens assembly 340 to move under the action of electromagnetic induction.

In other words, when the optical lens assembly 340 is disposed on the electrical bracket body 310 through the carrier 320, the optical lens assembly 340 performs auto focusing under the driving action of the multiple magnets 350 and the drive coil 360. The electrical bracket body 310 encloses the drive coil 360. That is, the electrical bracket body 310 is characterized in that a drive coil conductive layer that needs to be assembled at a later stage in the drive motor of the conventional camera module is pre-fabricated and assembled on the electrical bracket beforehand according to the circuit design. As such, the processing precision of the camera module may be increased, the length and the thickness of the camera module may be reduced, and the peripheral size of the camera module is reduced accordingly. In particular, the camera module of such structural design does not need to use the welding or gluing connection method, which further improves product reliability. The optical lens assembly 340 is located on the photosensitive path of the photosensitive chip 330. Thus, when the camera module is used for capturing an image of an object, lights reflected by the object can be received by the photosensitive chip 330 after being processed by the optical lens assembly 340 to be suitable for photoelectric conversion.

According to a preferred embodiment of the present disclosure, the electrical bracket body 310 includes a base 311 and a top wall 312. The top wall 312 extends vertically from the base 311, and may be annular. It may be understood that the drive coil 360 may be embedded in the top wall 312 or disposed on an inner side or outer side of the top wall 312. Accordingly, the electrical bracket body 310 of the present disclosure is integrated with the drive coil 360 to input a control current to the drive coil 360.

According to the electrical bracket body 310 of the present disclosure, the PCB circuit board of the conventional camera module is made into a bracket, so that the holder of the conventional camera module is removed. The electrical bracket body 310 functions as the carrier 320 for supporting the motor and achieves a function of conducting the photosensitive chip 330. That is, a groove or an accommodating cavity is formed within the electrical bracket body 310 for connecting the photosensitive chip 330. Moreover, since the drive coil 360 is directly integrated in the electrical bracket body 310, the input current of the electrical bracket body may be directly transmitted to the drive coil 360, unlike the structure of the conventional camera module, which requires an electrical connecting structure to connect the motor and the PCB circuit board.

Specifically, in this preferred embodiment, the base 311 has a topside groove 3113 and a bottom-side groove 3115 to respectively assemble an optical filter 370 and the photosensitive chip 330 of the camera module. It may be understood that, in this embodiment, the photosensitive chip 330 may be flipped into the bottom-side groove 3115. In other embodiments, the photosensitive chip 330 may also be directly accommodated in an intermediate through hole 3114 formed in the base, and both ends of the photosensitive chip 330 may be conductively connected to the inner surface of the base 311. Correspondingly, in this embodiment, the base 311 may have an annular sidewall 3111 and a bottom wall 3112 which form the grooves 3113 and 3115, and form the through hole 3114. It may be understood that in other embodiments, the based 311 may be alternatively not provided with the bottom wall 3112.

The electrical bracket body 310 also includes a series of connectors disposed on the surface of the electrical bracket body, including a series of photosensitive chip connectors, a series of circuit board connectors, and a series of electronic element connectors. In addition, a passive component such as a capacitor or a resistor is also embedded in the electrical bracket body 310, so that the electrical bracket body 310 can match the corresponding photosensitive chip 330 and an external circuit device. Meanwhile, the electrical bracket body 310 also integrates the drive coil body and the drive coil circuit of the drive coil 360 to electrically connect the motor to directly supply electric power to the motor and input a control current thereto, so that the lens assembly 311 can move to zoom.

In addition, the camera module includes a flexible circuit board, which is connected to the electrical bracket body 310. The electrical bracket body 310 may alternatively integrate the functions of the holder and the circuit board of the conventional camera module, to achieve the function of the flexible circuit board connecting the photosensitive chip 330. It is worth mentioning that the electrical bracket body 310 supports the photosensitive chip 330. In other words, the photosensitive chip 330 is electrically connected to the electrical bracket body 310. The photosensitive chip 330 includes a series of photosensitive chip guides and a photosensitive chip body, wherein the photosensitive chip guides are disposed on the photosensitive chip body. The electrical bracket body 310 is conductively connected to the photosensitive chip guides. In other words, the photosensitive chip 330 is conductively interconnected with the electrical bracket body 310, to enable the photosensitive chip 300 to normally operate.

In addition, the optical filter 370 of the camera module is used to filter out stray lights to further improve the image quality. The optical filter 370 is disposed between the photosensitive chip 330 and the optical lens assembly 340, and is supported by the electrical bracket body 310. For example, in a typical example, the optical filter 370 is an infrared cut filter.

It is worth mentioning that the drive coil 360 is wrapped in the electrical bracket body 310, wherein the drive coil 360 may be in any form, including but not limited to a monolayer metal, a multilayer metal, conductive non-metal whole piece, a conductive non-metal mesh, or a parallel array structure. In addition, the drive coil 360 may be disposed at any position of the electrical bracket body 310, including but not limited to one position or a combination of the bottom of the camera module, a side annular wrapping, and a top surface opening. In particular, the fabrication method of the drive coil 360 includes but not limited to electroplating, sedimentation, spraying, welding, and gluing.

It may be understood that, equivalently the electrical bracket body includes a carrier support section, an optical filter support section, and a chip support section. The electrical bracket support portion is vertically extended from the carrier support section. The optical filter support portion is recessed from the carrier support portion for supporting and fixing the optical filter 370. The chip support portion is located below the optical filter support portion to fix the photosensitive chip 330. Thus, when the photosensitive chip 330 is disposed on the chip support portion, the optical filter 370 is disposed on the filter support portion, and the optical lens assembly 340 is disposed on the carrier support portion of the electrical bracket body through the carrier 320, the optical lens assembly 340 may perform an autofocus by the driving of the multiple magnets 350 and the drive coil 360. When the image of the object is obtained, lights reflected by the object can be received by the photosensitive chip 330 after being processed by the optical lens assembly 340 to be suitable for photoelectric conversion.

In addition, according to the first preferred embodiment of the present disclosure, a method for fabricating and assembling a camera module is further provided, which includes the following steps:

(S01) pre-disposing a drive coil 360 in an electrical bracket body 310;

(S02) disposing one or more magnets 350 evenly on a carrier 320;

(S03) mounting an optical lens assembly 340 on the carrier 320;

(S04) connecting electrically a photosensitive chip 330 to the electrical bracket body 310;

(S05) disposing an optical filter 370 on the electrical bracket body 310; and (S06) mounting the optical lens assembly 340 connected to the carrier 320 to the electrical bracket body 310.

Those skilled in the art should understand that the order of assembling of the steps (S02) to (S06) is not absolute and may be adjusted according to the needs of the fabrication process.

According to step (S01), the drive coil 360 may be disposed at any position of the electrical bracket body 310 or may be in any form, such as a monolayer metal, a multi layer metal, or a conductive non-metal whole piece.

It is worth mentioning that the electrical bracket body 310 integrates the functions of the holder and the circuit board, and is also used to support and connect the optical filter 370, the photosensitive chip 330, the optical lens assembly 340 and the like.

Figure 7:
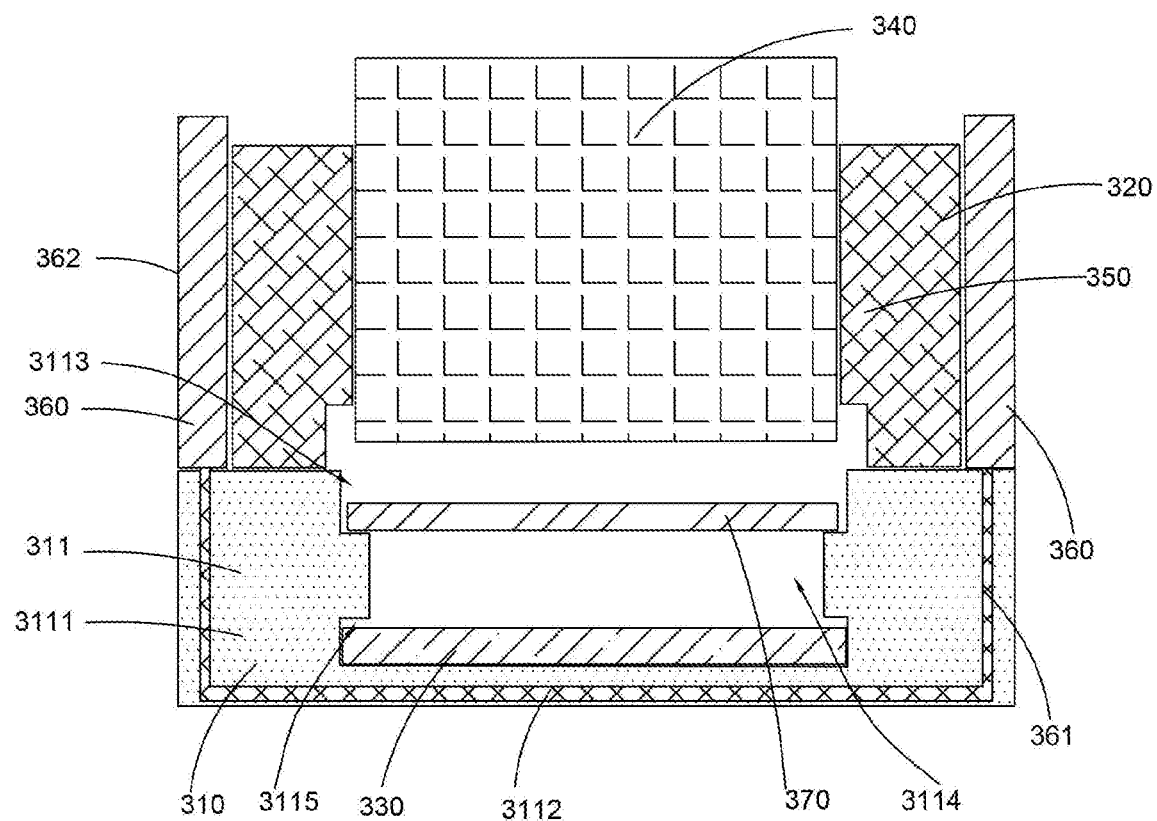
FIG. 7 is a schematic diagram of a camera module according to a fourth preferred embodiment of the present disclosure.

As shown in FIG. 7, a camera module according to the fourth preferred embodiment of the present disclosure is provided. The camera module includes an electrical bracket body 310, a carrier 320, a photosensitive chip 330, an optical lens assembly 340, multiple magnets 350, and a drive coil 360. The multiple magnets 350 are evenly disposed on the carrier 320. The optical lens assembly 340 is mounted on the carrier 320. The magnet 350 and the drive coil 360 may be used to drive the optical lens assembly 340 to move to perform auto focusing. The drive coil 360 is pre-fabricated in the electrical bracket body 310. The optical lens assembly 340 is located on the photosensitive path of the photosensitive chip 330. Thus, when the camera module is used for capturing an image of an object, lights reflected by the object can be received by the photosensitive chip 330 after being processed by the optical lens assembly 340 to be suitable for photoelectric conversion.

In addition, the camera module includes a flexible circuit board, which is connected to the electrical bracket body 310. The electrical bracket body 310 may alternatively integrate the functions of the holder and the circuit board of the conventional camera module, to achieve the function of the flexible circuit board connecting the photosensitive chip 330. It is worth mentioning that the electrical bracket body 310 supports the photosensitive chip 330. In other words, the photosensitive chip 330 is electrically connected to the electrical bracket body 310. The photosensitive chip 330 includes a series of photosensitive chip guides and a photosensitive chip body, wherein the photosensitive chip guides are disposed on the photosensitive chip body. The electrical bracket body 310 is conductively connected to the photosensitive chip guides. In other words, the photosensitive chip 330 is conductively interconnected with the electrical bracket body 310.

Similarly, the camera module includes an optical filter 370, wherein the optical filter is used to filter out stray lights to further improve the image quality. The optical filter 370 is disposed between the photosensitive chip 330 and the optical lens assembly 340, and is supported by the electrical bracket body 310.

It is worth mentioning that the drive coil 360 is wrapped in the electrical bracket body 310, wherein the drive coil 360 may be in any form, such as a monolayer metal, a multilayer metal, a conductive non-metal whole piece, a conductive non-metal mesh, or a parallel array structure. In addition, the drive coil 360 may be disposed at any position of the electrical bracket body 310, including but not limited to one position or a combination of the bottom of the camera module, a side annular wrapping, and a top surface opening. In particular, the fabrication method of the drive coil 360 includes but not limited to electroplating, sedimentation, spraying, welding, and gluing.

In addition, the drive coil 360 includes a drive coil circuit 361, and a drive coil body 362 connected to the drive coil circuit 361. The drive coil body 362 surrounds the carrier 320 provided with the multiple magnets 350. The drive coil circuit 361 is wrapped by the electrical bracket body 310 to be directly and conductively interconnected through the electrical bracket body 310. That is, in this preferred embodiment of the present disclosure, the electrical bracket body 310 may not include the top wall 312 and only include the base 311. The drive coil circuit 361 is embedded in the base 311, the drive coil body 362 is connected to the drive coil circuit 361, and is located around the carrier 320 to wrap the carrier 320.

Specifically, the drive coil circuit 361 of the drive coil 360 pre-fabricated in the electrical bracket body 310 is conductively connected to a drive coil body 362 of a voice coil motor (VCM), wherein the connecting process may be welding, conductive gluing, overlapping connection or the like. Thus, electromagnetic interference (EMI) shielding protection in multiple directions of the camera module may be further achieved. Therefore, the camera module may further increase the shielding effect while ensuring the reliability to the most extent.

In the present disclosure, the drive coil conductive layer conventionally assembled in the drive motor at a later stage is pre-fabricated or pre-assembled in the electrical bracket of the present disclosure, to reduce the size space occupied by the assembly tolerance, and at the same time saves the labor and material loss of assembling one by one. In addition, the processing precision is improved, and the size of the entire camera module is reduced.

Figure 8:
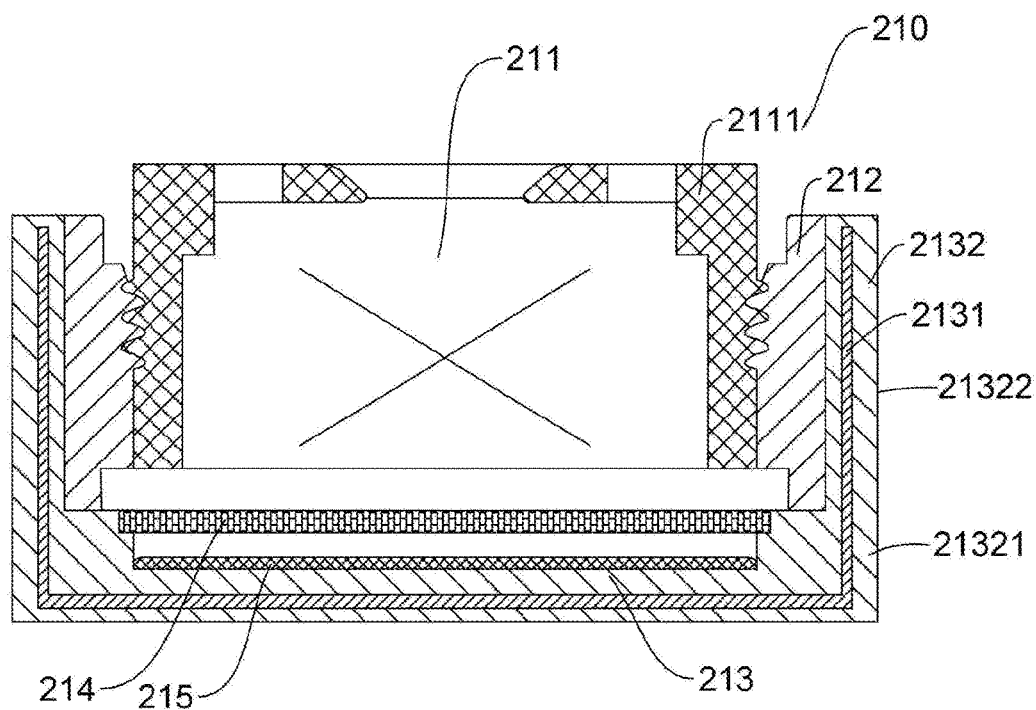
FIG. 8 is a schematic cross-sectional view of a camera module and an electrical bracket according to a fifth preferred embodiment of the present disclosure.

As shown in FIG. 8, a camera module 210 according to a fifth preferred embodiment of the present disclosure includes a lens assembly 211, a motor 212, an electrical bracket 213, an optical filter 214, and a photosensitive chip 215. The camera module 210 may also include a suited circuit board of a connecting device, i.e., a flexible printed circuit (FPC), or may be directly mounted on an electronic device having a matching circuit, to perform a camera function. The lens assembly 211 includes multiple lenses, and also has a sleeve 2111 (barrel) for providing protection and assisting in fixing and moving the lens assembly 211. The motor 212 is implemented in this embodiment as a drive mechanism surrounding the lens assembly 211 and having a permanent magnet and a coil. Each of two ends of the surrounding structure has an opening, the lower opening is connected to and matched with the electrical bracket 213, and the upper opening allows the lens assembly 211 to move on the side of the upper opening.

In this embodiment, the camera module 210 is an autofocusing module. When the motor 212 inputs a drive current, the motor 212 can drive the sleeve 2111 of the lens assembly connected to itself to make the lens assembly approach or move away from the photosensitive chip 215 to achieve the zoom effect. It may be understood that in other embodiments, the camera module may alternatively be a fixed-focus camera module, which does not have a drive mechanism like the motor.

In the present disclosure, the electrical bracket 213 includes an EMI shielding conductive layer 2131 and an electrical bracket body 2132. The electrical bracket body 2132 is made from a conventional PCB circuit board, that is, the conventional bracket is removed, and the PCB circuit board serves to provide a circuit and support the motor 212 and the photosensitive chip 215 at the same time.

It may be understood that the circuit is disposed on the electrical bracket body 2132 and is adapted to be electrically connected to the photosensitive chip 215 and the motor 212. Correspondingly, the electrical bracket 213 also includes a series of connectors disposed on the surface of the electrical bracket body, including a series of photosensitive chip connectors, a series of circuit board connectors, and a series of electronic element connectors. In addition, a passive component such as a capacitor or a resistor is also embedded in the electrical bracket 213, so that the electrical bracket 213 can match the corresponding photosensitive chip 215 and an external circuit device. Meanwhile, the electrical bracket 213 can also be electrically connected to the motor 212 to directly or indirectly provide power to the motor 212 and input a control current thereto, so that the lens assembly 211 can move to zoom.

In the present disclosure, most importantly, an EMI shielding conductive layer 2131 is further embedded in the electrical bracket 213 along the shape of the bracket, so that the electrical bracket 213 itself has an electromagnetic shielding effect to avoid an electromagnetic wave induction or influence between an object on one side of the EMI shielding conductive layer 2131, and the photosensitive chip 215 on the other side of the EMI shielding conductive layer 2131 and some of the passive components such as capacitors and resistors embedded in the electrical bracket. For example, in an embodiment, the EMI shielding conductive layer 2131 is made of copper, but those skilled in the art should understand that the implementation of the EMI shielding conductive layer 2131 should not be regarded as limiting the content and scope of the present disclosure. In practical applications, the material of the EMI shielding conductive layer 2131 may also be other metals, such as aluminum or steel. Alternatively, in order to prevent constant and extremely low frequency magnetic fields, ferrite and other materials may also be used, not limited to pure metal. A composite material may be used, or a conductive non-metal material may be used, or a shielding conductive paint may be injected into an interlayer cavity reserved in the electrical bracket 213. The material may be made into a monolayer structure, a multilayer structure, a mesh structure or a parallel array structure, etc., which may achieve the effect of generating the EMI shielding conductive layer 2131 to shield the electromagnetic influence. In addition, the fabrication method of the EMI shielding conductive layer 2131 also includes but is not limited to electroplating, sedimentation, spraying, welding, gluing, and die casting.

This structural design of the EMI shielding conductive layer 2131 does not require additional structural cooperation with the camera module 210, and the shielding layer is directly pre-fabricated inside the electrical bracket 213 in an embedding way. Thus, the size space occupied by the assembly tolerance may be reduced, and the labor of assembling one by one and the material loss due to high tolerance and artificial factors may also be spared. In addition, the method of pre-fabricating a replacing structural component in the electrical bracket 213 has a high precision. Compared with the conventional extra wrapping method, each of the length, width and thickness of the camera module 210 is reduced, and the peripheral size of the camera module 210 is correspondingly reduced, which improves product competitiveness and customer satisfaction. Moreover, the EMI shielding conductive layer 2131 can protect the camera module 210. In some embodiments, it may adopt a pre-fabricated structure without using a welding or gluing connection, which further improves the reliability of the product.

It may be understood that, in the present disclosure, the EMI shielding conductive layer 2131 and the electrical bracket body 2132 form an integral structure, which may not be the embedded way described above. That is, the EMI shielding conductive layer 2131 may be disposed at any position of the electrical bracket body 2132. The EMI shielding conductive layer 2131 may be an integral structure or may be a structure of multiple independent pieces. It may be formed at one position or a combination of the bottom of the camera module, a side annular package, and a top surface opening. The present disclosure is not limited in this regard, as long as the EMI shielding conductive layer 2131 forms an integral structure with the electrical bracket body 2132, and functions to prevent electromagnetic interference.

The optical filter 214 is used to filter out stray lights to further improve the image quality. For example, it may be an infrared cut filter. The photosensitive chip 215 is used for receiving and sensing the lights projected through the lens assembly 211 to output electronic signals through the electrical bracket 213 to the circuit board 20 or an electronic device having a matched circuit. The optical filter 214 and the photosensitive chip 215 are all fitted and fixed to the electrical bracket 213. The optical filter 214 is located on a side in which the electrical bracket 213 engages the motor 212, and the photosensitive chip 215 is located in the electrical bracket 213, so that after passing through the lens assembly 211, lights passes through the optical filter 214 before being projected onto the photosensitive chip 215.

In this embodiment, the electrical bracket body 2132 of the electrical bracket 213 includes a base 21321 and a top wall 21322 that extend from the base 21321 and is disposed on an outer side of the motor 212. The top wall 21322 covers the motor 212 on the outer side and is embedded along the electrical bracket 213, so that the EMI shielding conductive layer 2131 for wrapping and protecting the camera module 210 is correspondingly embedded along the extended top wall in the interior thereof to strengthen the electromagnetic wave protection of the elements of the camera module 210 wrapped by the electrical bracket 213. The base 21321 is correspondingly formed with an intermediate through hole, and grooves on the top side and the bottom side, respectively, to accommodate the optical filter 214 and the photosensitive chip 215, respectively. It may be understood that, in this embodiment, each of the groove widths is greater than the intermediate through hole, and the photosensitive chip 215 is suitable for being attached to the electrical bracket 213 by a flip-chip process. In other embodiments, the photosensitive chip 215 may alternatively be disposed in the intermediate through hole, and both ends of the photosensitive chip 215 are conductively connected to the inner surface of the electrical bracket 213. In this embodiment, the base 21321 may have an annular side wall and a bottom wall integrally formed with the side wall. In other embodiments, the base may not include the bottom wall.

Figure 9:
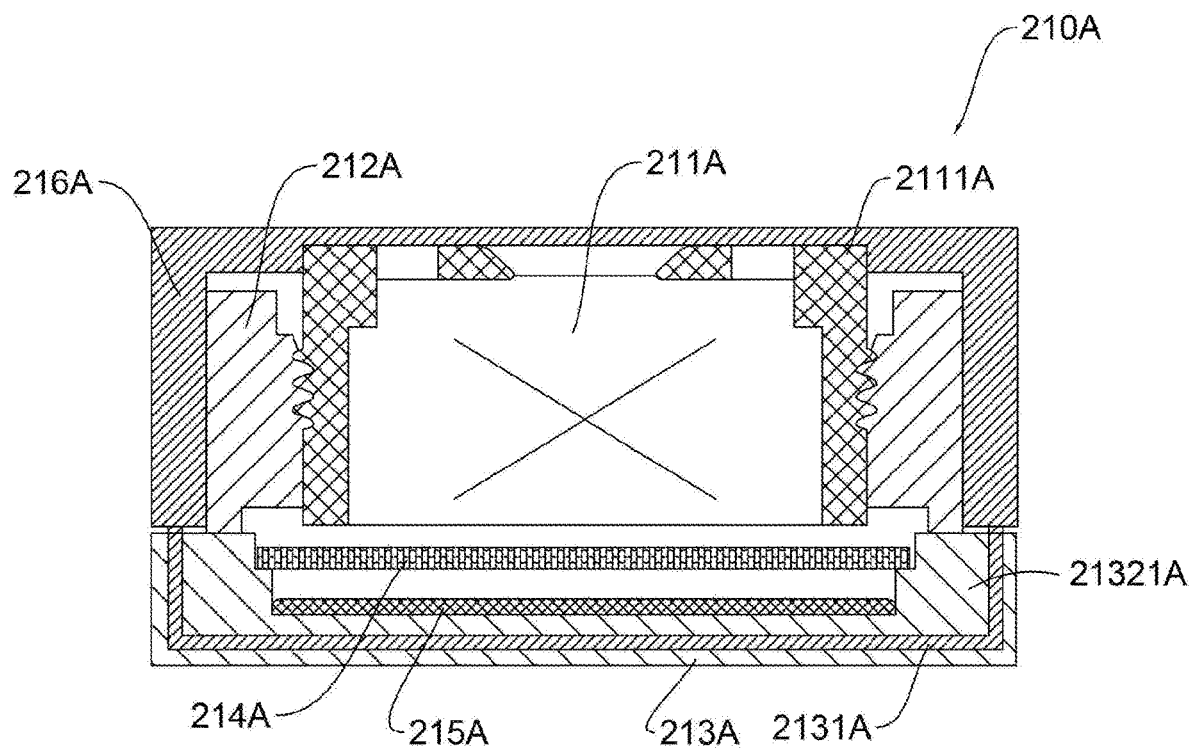
FIG. 9 is a schematic cross-sectional view of a camera module and an electrical bracket according to a sixth preferred embodiment of the present disclosure.

As shown in FIG. 9, a camera module 210A according to a sixth preferred embodiment of the present disclosure further includes an EMI shielding cover 216A. In addition, the electrical bracket 213A does not extend along the periphery of the motor 212A from the circumference of the holder structure formed by the electrical bracket 213A. In other words, the electrical bracket 213A still has a shape as a holder, that is, in this embodiment, the electrical bracket body 2132A of the electrical bracket 213A does not form the top wall 21322 in the above embodiment. The EMI shielding conductive layer 2131 embedded in the electrical bracket 213A extends beyond the electrical bracket 213A along the outer edge of the motor 212A from the circumference of the holder structure formed by the electrical bracket 213A, and is conductively connected to the EMI shielding cover 216A. Thus, the EMI shielding conductive layer 2131 completely covers the camera module 210A in combination with the EMI shielding cover 216A, and only a part of the housing of the electrical bracket 213A and its associated device are outside.

The method for electromagnetically connecting the EMI shielding cover 216A with the EMI shielding conductive layer 2131 is using a conductive glue for bonding. However, those skilled in the art should understand that the method for electromagnetically connecting the EMI shielding cover 216A with the EMI shielding conductive layer 2131 should not be considered as a limitation of the content and scope of the present disclosure. In practical applications, the EMI shielding cover 216A and the EMI shielding conductive layer 2131 may be conductively connected to each other, such as conductively glued, or only interlocked with each other, or ultrasonically connected with a metal gasket, or joined using a conventional welding method, or overlappingly connected. In order to avoid the occurrence of electromagnetic leakage, the EMI shielding cover 216A and the EMI shielding conductive layer 2131 may be electromagnetically connected using the above method to form a complete electromagnetic shielding mechanism.

The EMI shielding cover 216A, for example, may be composed of a copper-containing material, but those skilled in the art should understand that the implementation of the EMI shielding cover 216A should not be regarded as limiting the content and scope of the present disclosure. In practical applications, the material of the EMI shielding cover 216A may also be other metals, such as aluminum or steel. Alternatively, in order to prevent constant and extremely low-frequency magnetic fields, ferrite and other materials may be used, not limited to pure metal. Alternatively a composite material may be used, or a conductive non-metal material may be used, or the EMI shielding cover is made of a non-conductor material such as organic plastic and is wrapped by a coated shielding conductive paint. The EMI shielding cover 216A may be made into a monolayer structure, a multilayer structure, a mesh structure or a parallel array structure, etc. with the material, and the effect of generating the EMI shielding cover 216A to shield the electromagnetic influence may be achieved. In addition, the fabrication method of the EMI shielding cover 216A also includes but is not limited to electroplating, sedimentation, spraying, welding, gluing, and die casting.

Figure 10:
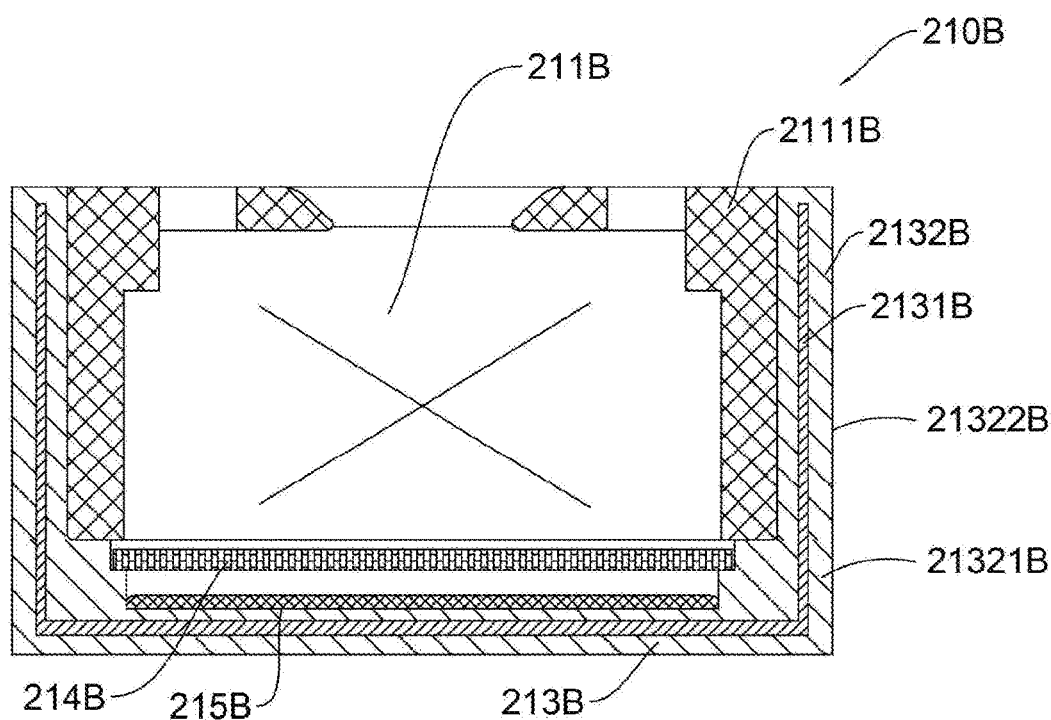
FIG. 10 is a schematic cross-sectional view of a camera module and an electrical bracket according to a seventh preferred embodiment of the present disclosure.

The camera module 210 (210A) according to the present disclosure is a dynamic focus module, wherein the lens assembly 211 (211A) can change the distance between the lens assembly and the photosensitive chip 215 by the motor 212 (212A). Correspondingly, the present disclosure also provides a fixed-focus module. As shown in FIG. 10, a camera module 210B according to a seventh preferred embodiment of the present disclosure is not provided with a motor 212 (212A), a sleeve 2111B is implemented as a lens structure for protecting and supporting the lens assembly 211B, and the lens assembly 211B is fixed to the electrical bracket 213B by the sleeve 2111B. The top wall 21322B extends from the periphery of the electrical bracket 213B along the outer edge of the sleeve 2111B, so that the camera module 210B is electromagnetically shielded by the EMI shielding conductive layer 2131B embedded in the electrical bracket 213B.

Figure 11:
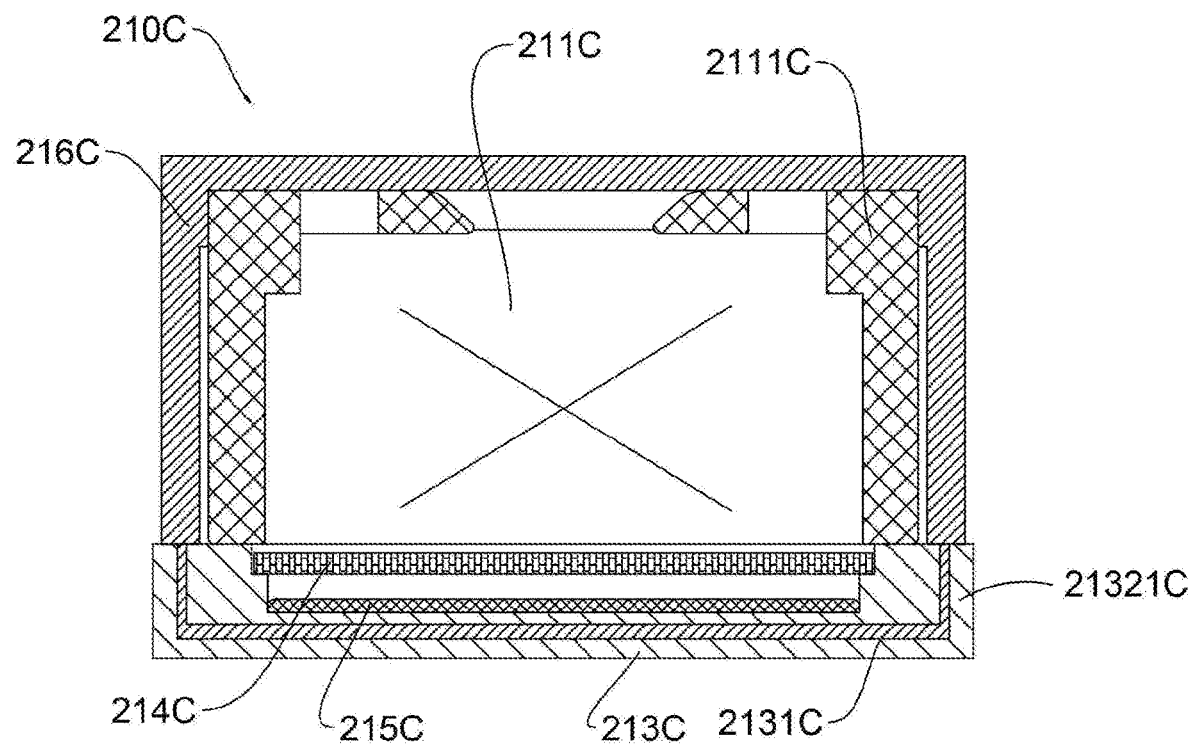
FIG. 11 is a schematic cross-sectional view of a camera module and an electrical bracket according to an eighth preferred embodiment of the present disclosure.

In addition, as shown in FIG. 11, a camera module 210C and an electromagnetic shielding component according to an eighth preferred embodiment of the present disclosure are provided, wherein the camera module is also not provided with a motor 212 (212A), a sleeve 2111C is also implemented as a structure for protecting and supporting the lens assembly 211C, and the lens assembly 211C is fixed to the electrical bracket 213C by the sleeve 2111C. The camera module 210C also includes an EMI shielding cover 216C. In addition, the electrical bracket 213C does not extend along the periphery of the sleeve 2111C from the circumference of the holder structure formed by the electrical bracket 213C. In other words, the electrical bracket 213C still has a shape of a holder. The EMI shielding conductive layer 2131C embedded in the electrical bracket 213C extends beyond the electrical bracket 213C along the outer edge of the sleeve 2111C from the circumference of the holder structure formed by the electrical bracket 213C, and is conductively connected to the EMI shielding cover 216C. Thus, the EMI shielding conductive layer 2131C completely covers the camera module 210C in combination with the EMI shielding cover 216C, and only a part of the housing of the electrical bracket 213C and its associated device are outside.

It is worth mentioning that the above camera modules according to different embodiments of the present disclosure are only preferred examples for illustrating that a prefabricated electrical bracket 213 provided with an EMI shielding conductive layer 2131 and/or an EMI shielding cover 216A can be precisely and quickly apply to the assembly of the camera module, so as to achieve the electromagnetic shielding protection of the camera module in different degrees or different shapes. In other words, those skilled in the art should understand that the embodiments of the EMI shielding conductive layer 2131 and the EMI shielding cover 216A should not be considered as limiting the content and scope of the present disclosure. In practical applications, the EMI shielding conductive layer 2131 is partially in the electrical bracket 213, and coated (including electroplating, sedimentation, spraying, welding, gluing, and die casting, etc.) on the side surface of the electrical bracket 213. The electrical bracket 213 provided with the EMI shielding conductive layer 2131 is formed into different shapes, or the wall 132 is extended in different ways (including covering the lens assembly 211 in different forms), or the EMI shielding cover 216A is implemented as different shapes, including using a transparent conductive material to achieve one or a combination of enclosing the surface on the outer side of the camera module 210A, the top surface opening, and covering only apart of the area. The EMI shielding cover 216A may be partially embedded in the electrical bracket body 2132 of the electrical bracket 213, and the other part is disposed on the outer side of the electrical bracket body 2132 of the electrical bracket 213; it may be entirely embedded in the electrical bracket body 2132 of the electrical bracket 213, and may be entirely disposed on the outer side of the electrical bracket body 2132 of the electrical bracket 213, or the like.

The method for assembling the camera module according to a preferred embodiment of the present disclosure includes the following steps: (a.1) disposing an EMI shielding conductive layer 2131 on an electrical bracket 213, (a.2) connecting conductively a photosensitive chip 215 to the electrical bracket 213, and (a.3) fixing a lens assembly 211 to a photosensitive path of the photosensitive chip 215. The step (a.3) may further include: (a.3.1) attaching an optical filter 214 to the electrical bracket 213, (a.3.2) fixing lenses of a lens assembly 211 to a sleeve 2111, and (a.3.2) supporting and fixing the sleeve 2111. The step (a.3.2) may further include: (a.3.2.1) mounting the sleeve 2111 to a motor 212, and (a.3.2.2) fixing the motor 212 to the electrical bracket 213. In the fixed focus module, the lens assembly 211 is supported by the electrical bracket 213.

Here, the step (a.1) is intended to provide the electrical bracket 213 with an electromagnetic shielding capability. Thus, besides above advantages such as improving the processing precision, lightening the product, and improving product reliability, in the assembly step, the process of winding or wrapping an electromagnetic shielding tape or the like on the product at the later stage of assembly is spared, thereby greatly reducing the assembly time and labor, and increasing the assembly efficiency while also improving the precision and reliability of the product. The step (a.2) is based on that the electrical bracket 213 has previously embedded circuits and related components, so that the photosensitive chip 215 may be connected directly and electrically thereto. The step (a.3) further fixes the lens assembly 211 to a suitable position of the electrical bracket 213 so that lights can be projected onto the photosensitive chip 215 to form an image after passing through the lens assembly 211, thus completing the assembly of the fixed-focus camera module. In addition, the step (a.3.1) is to attach the optical filter 214 to the electrical bracket 213 in order to reduce or avoid the influence of specific stray lights when the camera module is used for shooting. In the above embodiments, the optical filter 214 may be disposed between the lens assembly 211 and the photosensitive chip 215 to achieve the effect of first filtering and then sensitising. The step (a.3.2) is to use the sleeve 2111 to indirectly fix the lens assembly 211 to the corresponding position on the electrical bracket 213, so that lights can be projected onto the photosensitive chip 215 to form an image after passing through the lens assembly 211. In addition, if the zoom module is assembled, the step (a.3.2.1) and the step (a.3.2.2) are used. The step (a.3.2.1) is mainly to further install the lens assembly 211 equipped with the sleeve 2111 into the motor 212 matching the sleeve 2111, so that the motor 212 can move the lens assembly 211 independently or in cooperation with the sleeve, allowing an external device or circuit to move the lens assembly 211 by controlling the motor 212 to achieve zooming. Therefore, the motor 212 needs to be fixed to the electrical bracket 213 by the step (a.3.2.2), in order that when the motor 212 moves the lens assembly 211, the lens assembly 211 is moved relative to the photosensitive chip 215 fixed to the electrical bracket 213.

The method for assembling the camera module according to another preferred embodiment of the present disclosure further includes the following steps: (a.4) mounting an EMI shielding cover 216A on the electrical bracket 213A. The step (a.4) may further include: (a.4.1) covering an EMI shielding cover 216A on the electrical bracket 213A and (a.4.2) connecting electrically the EMI shielding cover 216A with the EMI shielding conductive layer 2131A. The step (a.4) is to combine a pre-fabricated EMI shielding cover 216A with the electrical bracket 213A to provide the electromagnetic shielding effect to the camera module 210A so as to achieve a more complete electromagnetic shielding protection. The difference between this method of using a pre-fabricated EMI shielding cover 216A and the conventional method of winding or wrapping an electromagnetic shielding tape or the like is that using of the pre-fabricated EMI shielding cover 216A can precisely control the thickness. When the thickness of each part is ensured, it not only has higher reliability, but also greatly reduces the size tolerance of the finished product. At the same time, the difficulty in assembly is greatly reduced, and the time and effort spent by the staff is also reduced, thereby greatly improving the assembly efficiency. The step (a.4.1) and the step (a.4.2) are for the case where the EMI shielding cover 216A is not a snap-fit type, when the EMI shielding cover 216A covers the electrical bracket 213A to collectively cover the camera module 210A, an additional conductive adhesive, conductive patch, welding, painting, or other means is required to firmly connect the EMI shielding cover 216A with the electrical bracket 213 and ensure that the two are electrically connected to each other or fill in voids that are not electrically conductive between the two, to avoid electromagnetic leakage or to enhance the electromagnetic shielding effect.

It should be understood by those skilled in the art that the embodiments of the present disclosure shown in the above description and the accompanying drawings are only examples and do not limit the present disclosure. The objective of the present disclosure has been achieved fully and effectively. The functional and structural principles of the present disclosure have been shown and described in the embodiments. Without departing from the principles described above, the embodiments of the present disclosure may have any variations or modifications.

What is claimed is:

1. A camera module, comprising:
   an optical lens assembly;
   a photosensitive chip;
   a support device, disposed below the optical lens assembly in a direction of receiving lights by the optical lens assembly, and configured to support the optical lens assembly;
   a circuit comprising a plurality of electronic components and a set of conductors conductively connected to the electronic components, the circuit being enclosed inside the support device and configured to conductively connect the photosensitive chip;
   a motor configured to drive the optical lens assembly to move, wherein the photosensitive lens assembly is disposed on the motor, the motor is supported by the support device, and the motor is conductively connected to the circuit; and a flexible circuit board disposed on a bottom of the support device, wherein the flexible circuit board is conductively connected to the circuit;

wherein the photosensitive chip is capable of receiving the lights passing through the optical lens assembly, and the circuit is firmly disposed inside of the support device to form an electrical bracket, wherein connecting elements are selected from a pad and a pin, and wherein the connecting elements comprise a series of photosensitive chip connecting components for conductively connecting the photosensitive chip to the electronic components, a series of circuit board connecting components for conductively connecting the flexible circuit board to the electronic components, and a series of motor connecting components for conductively connecting the motor to the electronic components.

2. The camera module according to claim 1, wherein the circuit further comprises a series of connecting elements, and the connecting elements conduct the electronic components and the conductors to the photosensitive chip.

3. The camera module according to claim 2, wherein the support device comprises a support body, and the electronic components are disposed on the support body.

4. The camera module according to claim 3, wherein the electronic components are embedded in the support body.

5. The camera module according to claim 4, wherein the conductors are disposed on the support body.

6. The camera module according to claim 5, wherein the conductors are embedded in the support body.

7. The camera module according to claim 6, wherein the support body has a bracket body surface, and the connecting elements are disposed on the support body, wherein a conductive connection between the connecting elements and the photosensitive chip is performed on the bracket body surface.

8. The camera module according to claim 7, wherein the connecting elements are disposed on the bracket body surface of the support body.

9. The camera module according to claim 1, wherein the circuit comprises a plurality of electronic components and a series of connecting elements, and the electronic components are conductively connected to the photosensitive chip via the connecting elements.

10. The camera module according to claim 9, wherein the support device comprises a support body, and the electronic components are disposed on the support body.

11. The camera module according to claim 10, wherein the electronic components are embedded in the support body.

12. The camera module according to claim 10, further comprising an optical filter, wherein the optical filter is disposed between the optical lens assembly and the photosensitive chip.

13. The camera module according to claim 1, wherein the photosensitive chip is disposed below the optical lens assembly in the direction of receiving lights by the optical lens assembly, and the photosensitive chip is flush with the support device along a direction perpendicular to the direction of receiving the lights.

* * * * *